US011416870B2

(12) United States Patent
Maung et al.

(10) Patent No.: US 11,416,870 B2
(45) Date of Patent: Aug. 16, 2022

(54) COMPUTING SYSTEMS FOR HETEROGENEOUS REGULATORY CONTROL COMPLIANCE MONITORING AND AUDITING

(71) Applicant: Box, Inc., Redwood City, CA (US)

(72) Inventors: Crispen Maung, Campbell, CA (US); Jeffrey R. Queisser, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 364 days.

(21) Appl. No.: 15/939,212

(22) Filed: Mar. 28, 2018

(65) Prior Publication Data

US 2018/0285887 A1 Oct. 4, 2018

Related U.S. Application Data

(60) Provisional application No. 62/478,491, filed on Mar. 29, 2017.

(51) Int. Cl.
*G06Q 30/00* (2012.01)
*G06Q 10/10* (2012.01)
*G06Q 10/06* (2012.01)

(52) U.S. Cl.
CPC ....... *G06Q 30/018* (2013.01); *G06Q 10/0635* (2013.01); *G06Q 10/10* (2013.01)

(58) Field of Classification Search
CPC ... G06Q 30/018; G06Q 10/0635; G06Q 10/10
See application file for complete search history.

(56) References Cited

U.S. PATENT DOCUMENTS

2008/0270207 A1* 10/2008 Santos .................. G06Q 10/10 705/7.41
2012/0072581 A1* 3/2012 Tung .................. H04L 67/1008 709/224

(Continued)

OTHER PUBLICATIONS

"GT Nexus Announces Major Expansion by Key Customer", [online], GT Nexus, Inc., 2013 [retrieved on Mar. 3, 2022]. Retrieved from the Internet:URL:www.retailitinsights.com/doc/gt-nexus-announces-major-expansion-by-key-customer-0001 (Year: 2013).*

(Continued)

*Primary Examiner* — Lynda Jasmin
*Assistant Examiner* — Ehrin L Pratt
(74) *Attorney, Agent, or Firm* — Vista IP Law Group, LLP

(57) ABSTRACT

Systems for centralized processing of regulatory control events. A method embodiment applies regulatory compliance rules against regulatory control events that occur at a plurality of heterogeneous remote cloud-based systems. A centralized cloud-based platform manages the compliance of the plurality of heterogeneous remote cloud-based systems by applying a set of data compliance rules pertaining to regulatory controls. The regulatory controls pertain to data access events and data manipulation events that occur on the plurality of computing systems. The centralized cloud-based platform receives control event messages, the control event messages being raised any one or more of the heterogeneous remote cloud-based systems. Rules are processed against the received control event messages to determine a set of compliance actions. Compliance action occurrences are logged in a log facility such that at any moment in time, an audit can be run over the logged events so as to verify and report compliance or non-compliance.

20 Claims, 16 Drawing Sheets

1B00

(56) References Cited

U.S. PATENT DOCUMENTS

| | | | | |
|---|---|---|---|---|
| 2013/0227352 A1* | 8/2013 | Kumarasamy | G06F 11/1461 | 714/47.1 |
| 2016/0057025 A1* | 2/2016 | Hinrichs | H04L 41/5025 | 709/224 |
| 2018/0034703 A1* | 2/2018 | Anholt | H04L 41/0893 | |

OTHER PUBLICATIONS

Force, Joint Task. Security and Privacy Controls for Information Systems and Organizations. No. NIST Special Publication (SP) 800-53 Rev. 5 (Draft). National Institute of Standards and Technology, 2017.
"Payment Card Industry Data Security Standard", Wikipedia.com, URL: https://en.wikipedia.org/wiki/Payment_Card_Industry_Data_Security_Standard, Feb. 3, 2018.
Weeks, D., "S3mper: Consistency in the Cloud" Netflix Technology Blog, Jan. 9, 2014.

* cited by examiner

600

Mapping Table 602

| Source | Purpose | Compliance Regulations | Compliance Actions | Target Format |
|---|---|---|---|---|
| URL1 | Upload Processing | Controls {C1,C2} | Store emissions {E1,E3} | CommonFormat1 |
| URL2 | Test Suite Processing | Controls {T1,T2} | Store Results of Tests {T1,T2} | CommonFormat1 |
| URL<N> | <Purpose> | <Controls> | <Logging> | CommonFormat1 |

FIG. 6

COMPUTING SYSTEMS FOR HETEROGENEOUS REGULATORY CONTROL COMPLIANCE MONITORING AND AUDITING

RELATED APPLICATIONS

The present application claims the benefit of priority to U.S. Patent Application Ser. No. 62/478,491 titled "COMPLIANCE VERIFICATION TOOL", filed Mar. 29, 2017, which is hereby incorporated by reference in its entirety.

FIELD

This disclosure relates to computing system architecture, and more particularly to techniques used in computing systems that perform regulatory control compliance monitoring, auditing, and reporting.

BACKGROUND

In today's computing systems, compliance regulations and data that emerges from controls that pertain to ensuring performance of the obligations that arise from such regulations is processed in many different ways, involving many different types of processes, many different formats, many different communication techniques, etc. Any particular combination of a particular data format and the particulars of where/how it is stored or processed demands that these systems be configured in a manner that ensures the effective processing (e.g., protection) of that data in accordance with the regulatory obligations.

Many industries are subject to controls and limitations that derive from one or more regulatory agencies, and in many cases the controls and limitations are implemented using computing systems. In fact, many industries are service-centric and provide services to their users by deploying computing systems that are particularly configured for providing one or more services to users. At the same time, the manner of provision of such computerized services are often subject to regulatory obligations. Thus, these computer systems are configured to meet data protection obligations pertaining to the data that is received and/or generated during the provision of such computerized services.

In modern enterprise environments, as more and more cloud platforms are employed for storing and/or processing data, the lack of data access interoperability and/or the lack of data format consistency between these cloud systems raises significant computing and oversight challenges. Specifically, differences between hardware platforms, differences between operating systems, differences between storage devices, differences in implementation configurations, etc., combined with the fact that in modern settings there is an enormous amount of data to process, it becomes logistically challenging to collect and analyze such disparate data from such disparate systems. This situation is exacerbated by the fact that new data of new data types and new platforms and new operating systems are rolled-out every day, making it a practical impossibility to stay up-to-date.

The foregoing computing problem is brought to bear in many service industries that are scrutinized by many regulatory agencies. For example, in an environment where regulatory controls are present (e.g., controls over when, how, and what types of data can be transmitted across jurisdictional boundaries and how that data can be used) changes to rules happen frequently, the permitted data formats change frequently (e.g., as standards for interoperability are adopted), and also, the methods for establishing and documenting compliance to the regulatory controls change frequently (e.g., as auditing techniques become stricter and stricter, etc.). Moreover, the regulations and controls to establish compliance (e.g., in a compliance report) and/or the manner of auditing compliance change frequently (e.g., as new regulatory controls are legislated and enforced). For example, regulations control if/when/how certain types of computer data can or cannot be exported outside of a particular jurisdiction. As another example, regulations might apply to certain entities (e.g., companies, institutions) to control processing and/or storing and/or other handling of personally identifiable data.

In many jurisdictions, governmental and industry specific regulatory agencies demand periodic auditing so as to verify compliance to regulations under their purview. As the number of regulatory agencies increase, and as computing within those regulated domains that are subjected to the compliance regulations of those regulatory agencies increase, so do the computing techniques used by the entities when handling data in a manner that can be audited (e.g., by a regulatory agency or auditing firm).

One way to address the foregoing is to establish a single manner and style for all compliance-related activities. Unfortunately the goal of establishing such a single manner and style for all compliance-related activities presents significant barriers to adoption and implementation. Moreover, the rate at which new regulations emerge and the rate at which entities become subjected to such regulations is ever increasing as entities take on new business opportunities and markets. What is needed is a way to standardize on how to observe, process and audit regulated acts such that multiple computer systems can interoperate to perform heterogeneous regulatory control compliance monitoring and auditing.

SUMMARY

The present disclosure describes techniques used in systems, methods, and in computer program products that embody computerized techniques for implementing regulatory control compliance monitoring and auditing capabilities. The present disclosure describes systems and software to deploy a centralized cloud solution that serves as a centralized point in a cloud-oriented ecosystem comprising multiple cloud-based service providers that subscribe to the centralized cloud solution. The centralized cloud solution verifies that actions and/or operations performed by subscribers are being performed in accordance with a set of regulatory compliance rules. The events or occurrences of such actions and/or operations performed by subscribers are captured in messages that are sent to the centralized cloud solution. Despite the fact that any particular subscriber might define and implement their own set of control points, and despite the fact that any particular subscriber might define and implement their own collection techniques, data formats, application programming interfaces, network interfaces, etc., the centralized cloud solution is able to apply regulatory compliance rules against aspects of any event or message raised by any subscriber.

More specifically, the centralized cloud-based solution can verify that data is being used in a manner that meets regulatory obligations and/or data protection obligations that an organization might place on itself. Such techniques advance the relevant technologies to address technological issues with legacy approaches. Certain embodiments are directed to technological solutions for mapping heterogeneous data representations of regulations into a common data format for auditing compliance/non-compliance of acts that are subject to the regulations.

The disclosed embodiments modify and improve over legacy approaches. In particular, the herein-disclosed techniques provide technical solutions that address the technical problems attendant to federating data collection, data formatting and data communications. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of distributed computing systems that operate over heterogeneous data as well as advances in various technical fields related to human-machine interfaces.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 6 depicts a mapping rule implementation for use in systems that perform heterogeneous regulatory control compliance monitoring and auditing, according to an embodiment.

DETAILED DESCRIPTION

Figure 1A:
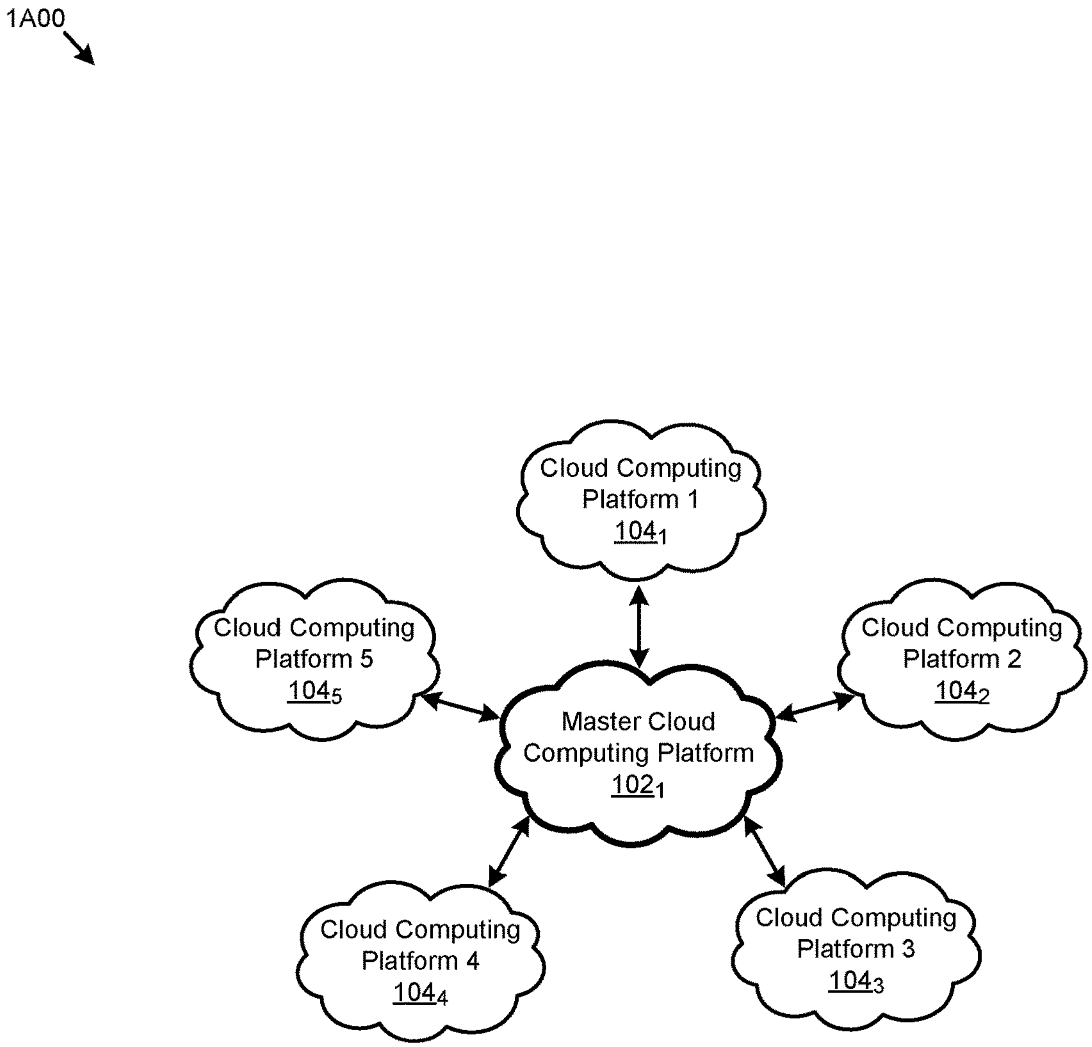
FIG. 1A exemplifies a hub-and-spoke configuration of multiple cloud computing platforms as interconnected for heterogeneous regulatory control compliance monitoring and auditing, according to an embodiment.

Embodiments in accordance with the present disclosure address the problem of federating data usage, formats, and communication styles used in auditing compliance/non-compliance of computing actions that are subject to regulatory controls. Some embodiments are directed to approaches for mapping heterogeneous data representations of regulations into a common data format for auditing compliance/non-compliance of acts that are subject to the regulations. The accompanying figures and discussions herein present example environments, systems, methods, and computer program products for computing systems for heterogeneous regulatory control compliance monitoring and auditing.

OVERVIEW

Modern computing ecosystems often include many different and independently-administrated computing systems that operate based on different respective platforms involving different hardware, different operating systems, different storage facilities, different localizations, different data formats, different implementation configurations, etc. Nonetheless, in some circumstances, such as are present when capturing data to support regulatory compliance, the heterogeneous characteristics of the aforementioned different and independently-operating computing systems, their differing configurations and the volume of such regulatory compliance data presents a challenging computer interoperability problem. Specifically, in the context regulatory data protection control compliance, monitoring, and auditing the data formats and technology configurations pertaining to compliance regulations change frequently. Also, in this context, new regulations and/or new obligatory control measurements and/or new reporting requirements emerge almost daily due to outcomes resulting from development of new standards and/or new interpretations of regulatory standards. Often, together with such new obligatory control measurements and/or new reporting requirements come new data capture format requirements as well as new processing and reporting requirements.

The figures and discussion herein disclose computing techniques that address data handling, event logging, intersystem communications as well as other computing techniques that apply to federation of new regulations, new obligatory control measurements, and new reporting requirements involving new standards and/or interpretations of new or existing standards.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1A exemplifies a hub-and-spoke configuration 1A00 of multiple cloud computing platforms as interconnected for heterogeneous regulatory control compliance monitoring and auditing. As an option, one or more variations of hub-and-spoke configuration 1A00 or any aspect thereof may be implemented in the context of the architecture and functionality of the embodiments described herein. The hub-and-spoke configuration 1A00 or any aspect thereof may be implemented in any environment.

FIG. 1A illustrates interconnection aspects pertaining to systems for mapping heterogeneous data representations of regulations into a common data format for auditing compliance/non-compliance of acts that are subject to the regulations. Specifically, the figure is being presented with respect to its contribution to addressing the problem of federating data formats used in auditing compliance/non-compliance of acts that are subject to regulatory controls.

In this depiction, many different cloud computing platforms (e.g., cloud computing platform $\mathbf{104}_1$, cloud computing platform $\mathbf{104}_2$, cloud computing platform $\mathbf{104}_3$, cloud computing platform $\mathbf{104}_4$, cloud computing platform $\mathbf{104}_5$) operate independently to perform one or more computing services.

Each of the cloud computing platforms might perform services that are subject to regulation (e.g., due to these systems having access to the regulated data). In some cases, the regulations that apply to one of the cloud computing platforms might also apply to another one or more of the cloud computing platforms. In other cases, each cloud computing platform is subjected to a particular set of regulations that is unique to its underlying computing services. To ameliorate the problem of so many different regulatory configuration settings, the master cloud computing platform $\mathbf{102}_1$ implements a compliance engine that federates data formats and communication techniques as used for auditing compliance/non-compliance of acts performed on the platform and/or compliance/non-compliance of changes made to systems configurations that either are subject to regulatory controls or that facilitate the processing of such data. One example embodiment of a compliance engine is shown and described as pertains to FIG. 1B.

Figure 1B:
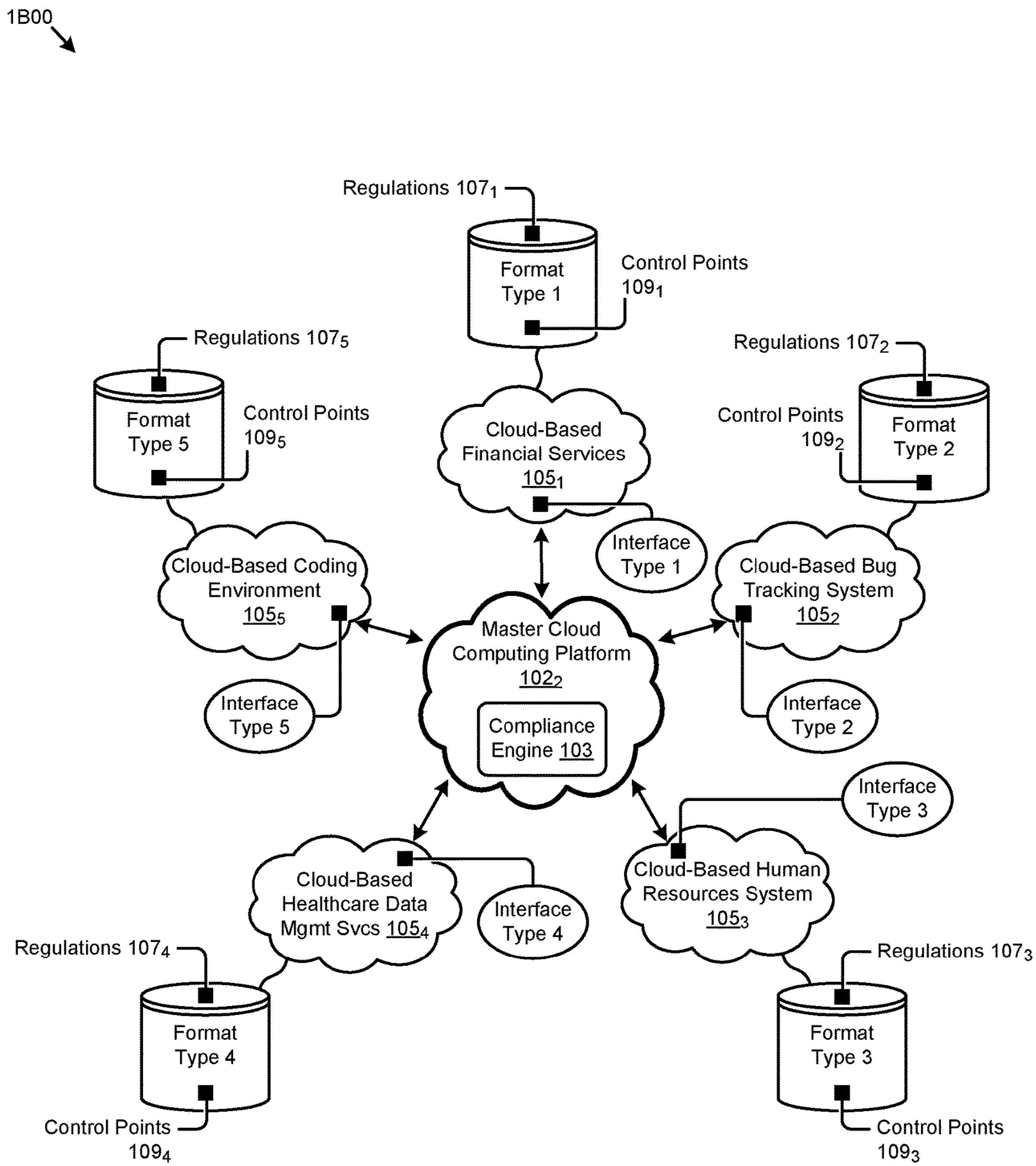
FIG. 1B depicts a centralized cloud-based compliance engine as used in a heterogeneous regulatory control compliance monitoring and auditing environment, according to an embodiment.

FIG. 1B depicts a centralized cloud-based compliance engine 1B00 as used in a heterogeneous regulatory control compliance monitoring and auditing environment. As an option, one or more variations of centralized cloud-based compliance engine 1B00 or any aspect thereof may be implemented in the context of the architecture and functionality of the embodiments described herein. The centralized cloud-based compliance engine 1B00 or any aspect thereof may be implemented in any environment.

Embodiments of the present disclosure are directed to systems and methods that enable enterprises and businesses to determine and demonstrate that their business operations and supporting information technology (IT) solutions are complying with data regulation requirements pertinent to their industries and their own framework of control (e.g., which might be patterned after or based on a risk profile). The data regulation requirements, for example, can be based on a data type and a geographic location associated with the data. In some embodiments the disclosed technology prohibits non-compliant business operations, and report such non-compliant business operations to data security and/or data protection teams and managers of the enterprise.

Any number of independently operated cloud platforms (e.g., owned and operated by different parties) can leverage the compliance monitoring features of a centralized cloud-based collaboration platform such as the shown master cloud computing platform. As aforementioned, monitoring and ensuring compliance across multiple cloud-based service providers can be challenging. Thus, as shown, multiple cloud-based service providers avail of the centralized compliance monitoring features of the disclosed master cloud computing platform $\mathbf{102}_1$. Specifically, the shown compliance engine 103 serves to manage logging, auditing and reporting with respect to heterogeneous regulatory compliance.

As shown, any one of the many cloud-based collaboration platforms is associated with a series of regulations and respective sets of controls, each of which regulations and/or controls may be codified in heterogeneous formats. Such regulations (e.g., regulations $107_1$, regulations $107_2$, regulations $107_3$, regulations $107_4$, regulations $107_5$) might be codified in a corresponding format (e.g., format type 1, format type 2, format type 3, format type 4, format type 5, etc.). Furthermore, any of the controls at any control point (e.g., control point $109_1$, control point $109_2$, control point $109_3$, control point $109_4$, control point $109_5$) corresponding to any one or more of the regulations might be might be codified in a format that comports with the regulation.

In example embodiments, certain of these controls (e.g., data controls) define how the data protection framework can meet the regulatory data protection obligations placed on the enterprise. As an example, some such data controls define how people access these systems as well as how an enterprise can restrict access to any data (e.g., internal or external data). Some data controls serve to observe and/or control and/or manage how data is being used within the enterprise. Some such controls can include privilege settings which can be used, at least in part, to determine that the cloud-based system is being accessed by only those people or processes that actually have the need and/or collaboration attributes to access the cloud-based systems and that these people or processes actually are accessing and using the cloud-based systems in accordance with the controls. Some operations at certain control points serve to enforce that data is only used in a manner that complies with applicable regulatory obligations.

Access to any data of any of the many cloud-based collaboration platforms might be facilitated by a particular access mechanism that is pertinent to the regulatory obligations. As shown, the master cloud computing platform $102_2$ interfaces with the various cloud-based services through any number of interfaces (e.g., interface type 1, interface type 2, interface type 3, interface type 4, interface type 5, etc.). The network configuration at the master cloud computing platform $102_2$ interfaces to any/all of such interfaces. Furthermore, in some embodiments, various networking interfacing (e.g., protocol translation, network address translation, port forwarding, etc.) can be done by components of the master cloud computing platform $102_2$ possibly before passing network traffic to the compliance engine 103. In some cases, the determination and usage of any particular networking interfacing (e.g., interface type 1, interface type 2, interface type 3, interface type 4, interface type 5, etc.) might be specific to the particular type of service being provided, and/or might be might be specific to the particular compliance data being handled by the service. As such, the data, including compliance data as well as the networking interfaces over which the data, including compliance data might be communicated is to be converted into a common format as used by the compliance engine 103.

More specifically, the compliance engine 103 is interfaced to a first computing system (e.g., any one of the cloud-based financial services $105_1$, or the cloud-based bug tracking system $105_2$, or the cloud-based human resources system $105_3$, or the cloud-based healthcare data management services $105_4$, or the cloud-based coding environment $105_5$), where the first computing system comprises first compliance data in a first format. The compliance engine 103 is also interfaced to a second computing system (e.g., any other one of the cloud-based financial services $105_1$, or the cloud-based bug tracking system $105_2$, or the cloud-based human resources system $105_3$, or the cloud-based healthcare data management services $105_4$, or the cloud-based coding environment $105_5$) that comprises second compliance data in a second format.

As shown, the compliance engine 103 is implemented as a third computing system at master cloud computing platform $102_2$ that is interfaced to both the first computing system and the second computing system. As such, the compliance engine 103 receives the first compliance data in the first format and receives the second compliance data in the second format. The compliance engine processes the different data formats to generate the compliance data in a common format, which is stored for later retrieval and/or for ongoing processing.

The foregoing description of the centralized cloud-based compliance engine 1B00 is merely one illustrative embodiment that depicts a particular configuration in a hub-and-spoke network arrangement. Other configurations are possible, some of which are discussed infra. Furthermore, once configured, the centralized cloud-based compliance engine 1B00 serves to map heterogeneous data representations of regulations into a common data format that can then be used for logging, auditing and reporting. One possible arrangement of operations is given in FIG. 2.

Figure 2:
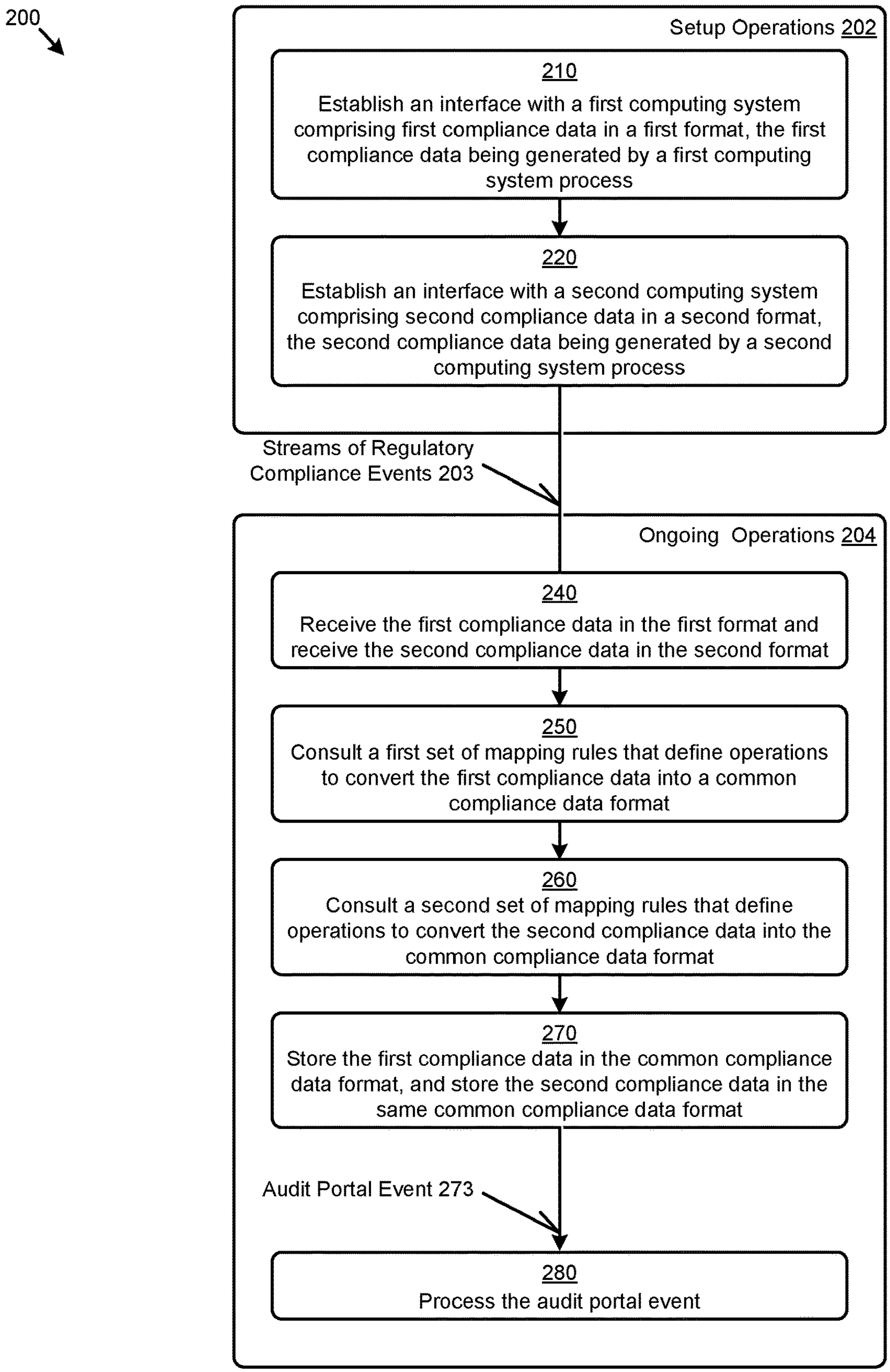
FIG. 2 depicts a computer-implemented technique as used in systems that perform heterogeneous regulatory control compliance monitoring and auditing, according to an embodiment.

FIG. 2 depicts a computer-implemented technique 200 as used in systems that perform heterogeneous regulatory control compliance monitoring and auditing. As an option, one or more variations of computer-implemented technique 200 or any aspect thereof may be implemented in the context of the architecture and functionality of the embodiments described herein. The computer-implemented technique 200 or any aspect thereof may be implemented in any environment.

FIG. 2 illustrates one aspect pertaining to mapping heterogeneous data representations of regulations into a common data format for auditing compliance/non-compliance of acts that are subject to the regulations. Specifically, the figure is being presented with respect to its contribution to addressing the problem of federating data formats used in auditing compliance/non-compliance of acts that are subject to regulatory controls. More specifically, the figure depicts how a stream of regulatory compliance events (e.g., ongoing occurrences of controlled events) that are raised from heterogeneous platforms (e.g., a financial services platform, a bug tracking system, etc.) are processed so as to federate the different data formats and different communication techniques that are used for auditing compliance/non-compliance under different regulatory scenarios.

The flow includes processing of several setup operations 202, after which setup operations have completed the system is available to process ongoing streams of regulatory compliance events 203.

The setup operations can be performed in any environment that supports multiple computing systems. In the shown example, a computing system is designated to be an instance of a master cloud computing platform. An administrator or other user configures communication paths between the instance of the master cloud computing platform and a first computing system (at operation 210). The established communication path(s) might be over a network such as a public switched network, or might be over a private "leased line", or any combination. In some cases, the established communication path(s) might comprise communication between computing processes, which communication might be carried out wholly within the bounds of a subnet.

Further, the administrator or other user of the instance of the master cloud computing platform establishes communication with a second computing system (at operation 220). The aforementioned configuration might entail configuration of the instance of the master cloud computing platform to handle compliance data of various types. Once the setup operations have been at least initiated (e.g., via initiation of operation 210 and/or via initiation of operation 220), streams of regulatory compliance events can be received.

Specifically, and as shown in this embodiment, upon receipt of an initial incoming regulatory compliance event, a set of ongoing operations 204 are invoked. The ongoing operations include receiving compliance data from two different platforms (step 240). For aforementioned reasons, the compliance data from the two different platforms are often different. The differences include, but are not limited to differences in the syntax of the data, differences in the semantics of the data, differences in the mechanism for communication, etc.

So as to be able to process compliance data from any platform, at step 250 and step 260, the data undergoes a conversion into a common format. A first set of mapping rules is used to convert data from a first platform into the common format, and a second set of mapping rules is used to convert data from a second platform into the same common format. The converted data is stored (step 270). The compliance data can be sent from any network location to any other network location over any combination of public and/or private networks. The data might traverse through network equipment that is situated in different countries or jurisdictions. In some cases, the data is encoded and/or compressed and/or sent over secure protocols such as "https:".

The techniques used to convert data from one format into the common format can include use of mapping tables, syntactical conversion parsing, plug-ins, etc. Moreover, the techniques used to receive data from a sending network location to the receiving network location can include use of firewalls, gateways, routers, etc. Strictly as an example, compliance data received via an unencrypted payload over layer 4 TCP sockets might be converted at any point into an encrypted payload and sent over a layer 5 communication link. Furthermore, the techniques used to store any item from the streams of regulatory compliance events might depend on the nature of the item. In some cases, the received compliance data item might comprise data that is to be reused almost immediately, in which case the received compliance data item might be stored in an in-memory cache for fast access. In other cases, the received compliance data item might comprise "large data" such as a patient's X-ray data, in which case the storage facility used might use spinning media or an offsite facility to store the received compliance data item or items.

At any moment in time, an audit portal event 273 might be raised by any computing entity. Such an audit portal event might be received by the master cloud computing platform, or such an audit portal event might be received by a middleware component or other agent of the master cloud computing platform. Step 280 initiates processing of the audit portal event 273. Any steps performed by any of the ongoing operations 204 can be performed in parallel with each other, or they can be performed in a sequence.

The foregoing discussion of FIG. 2 includes techniques for handling events that pertain to managing regulatory compliance and/or auditing. Such events often are raised by operation of controls that regulate how people or systems can access data. Such controls can include access or privilege settings that are assigned to particular people or systems. Also, such controls can include security controls that specify how compliance data is to be encrypted, and/or, such controls can include export controls that bound the limits of data communication to specific countries or jurisdictions. Any of such controls can derived from any regulatory agency or any standard. However, for ease of gathering and storing disparate sets of controls, a control layer that amalgamates controls from any source can be implemented. One example of gathering and storing into a federated control layer is given in FIG. 3A.

Figure 3A:
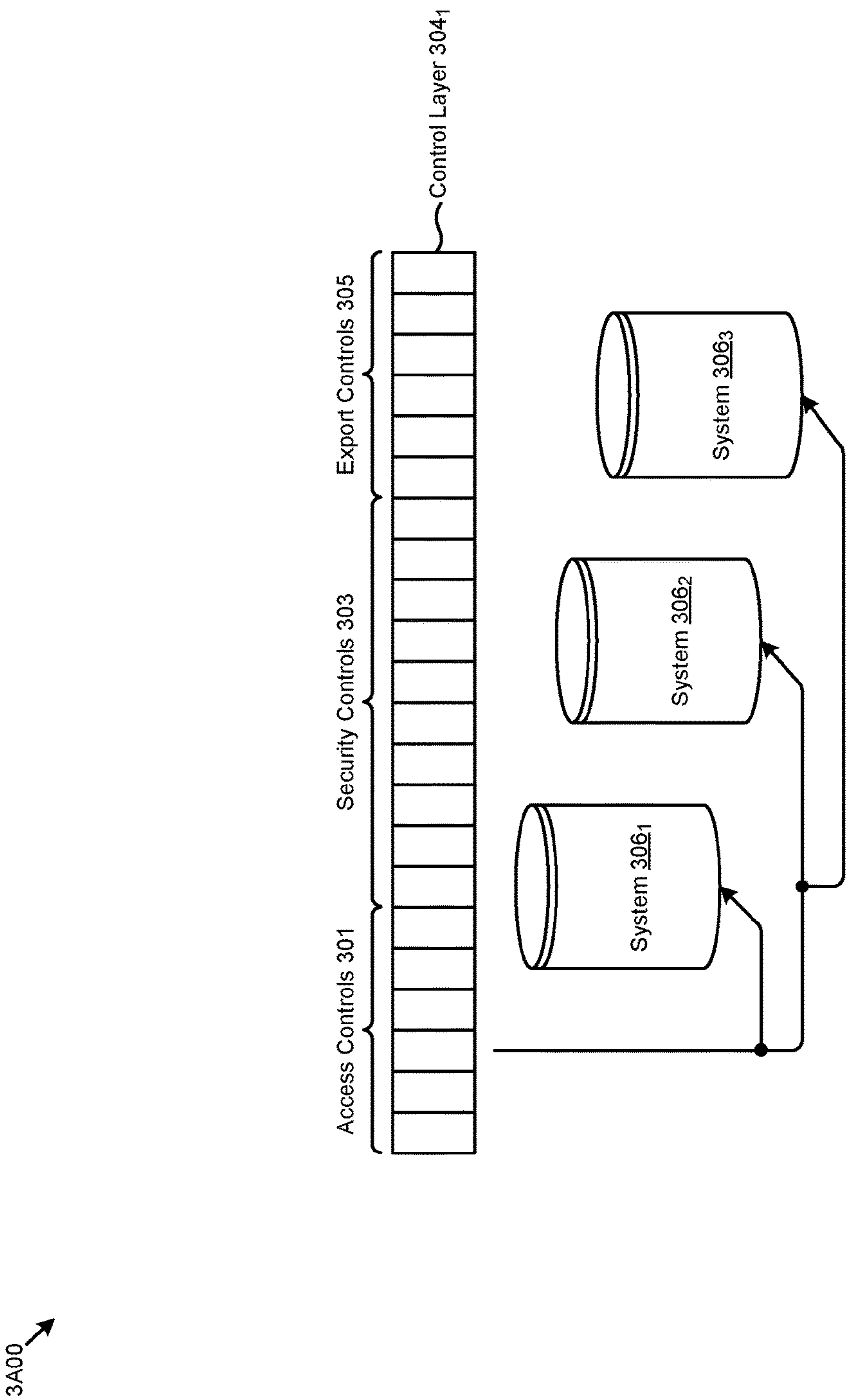
FIG. 3A depicts a computer-implemented data gathering and storage technique as used in systems that perform heterogeneous regulatory control compliance monitoring and auditing, according to an embodiment.

FIG. 3A depicts a computer-implemented data gathering and storage technique 3A00 as used in systems that perform heterogeneous regulatory control compliance monitoring and auditing. As an option, one or more variations of computer-implemented data gathering and storage technique 3A00 or any aspect thereof may be implemented in the context of the architecture and functionality of the embodiments described herein. The computer-implemented data gathering and storage technique 3A00 or any aspect thereof may be implemented in any environment.

FIG. 3A illustrates aspects of forming a control layer $\mathbf{304}_1$ as pertains to mapping heterogeneous data representations of regulations into a common data format for auditing compliance/non-compliance of acts that are subject to the regulations. Specifically, the figure is being presented with respect to its contribution to addressing the problem of implementing a control layer that serves to federate different controls that derive from corresponding different regulations.

Such controls can be defined based on regulatory standards, such as National Institute of Standards and Technology (NIST) standard 800-53, and/or payment card interfaces (PCI), etc. The regulatory standards can have different types of control "families". The shown examples of access controls 301, security controls 303, and export controls 305 are merely illustrative examples of different types of control families. A regulatory authority, a standardization authority or an enterprise might define yet other control families that pertain to any operational processes within an organization that might require formal control and subsequent confirmation that these controls are in place and working effectively. Examples of other control families might include control families associated with data protection and the ability to confirm (e.g., via certain data controls) that data is being used appropriately throughout the organization as well as with respect to communications to/from any/all of the constituents of the cloud computing ecosystem.

As shown, these control families can be included as part of a control layer $\mathbf{304}_1$. All or a portion of the controls in a control layer can be stored in separate systems or storage areas. As depicted by the occurrence of system $\mathbf{306}_1$, system $\mathbf{306}_2$, and system $\mathbf{306}_3$, the controls can be partitioned in accordance with any regime (e.g., by family, or by importance, or by hierarchy, etc.) Moreover, all or part of such a control layer can be implemented in any partitioning or in any environment. More particularly, the embodiment shown in FIG. 3A is merely one example. An alternative partitioning is shown and described as pertains to FIG. 3B.

Figure 3B:
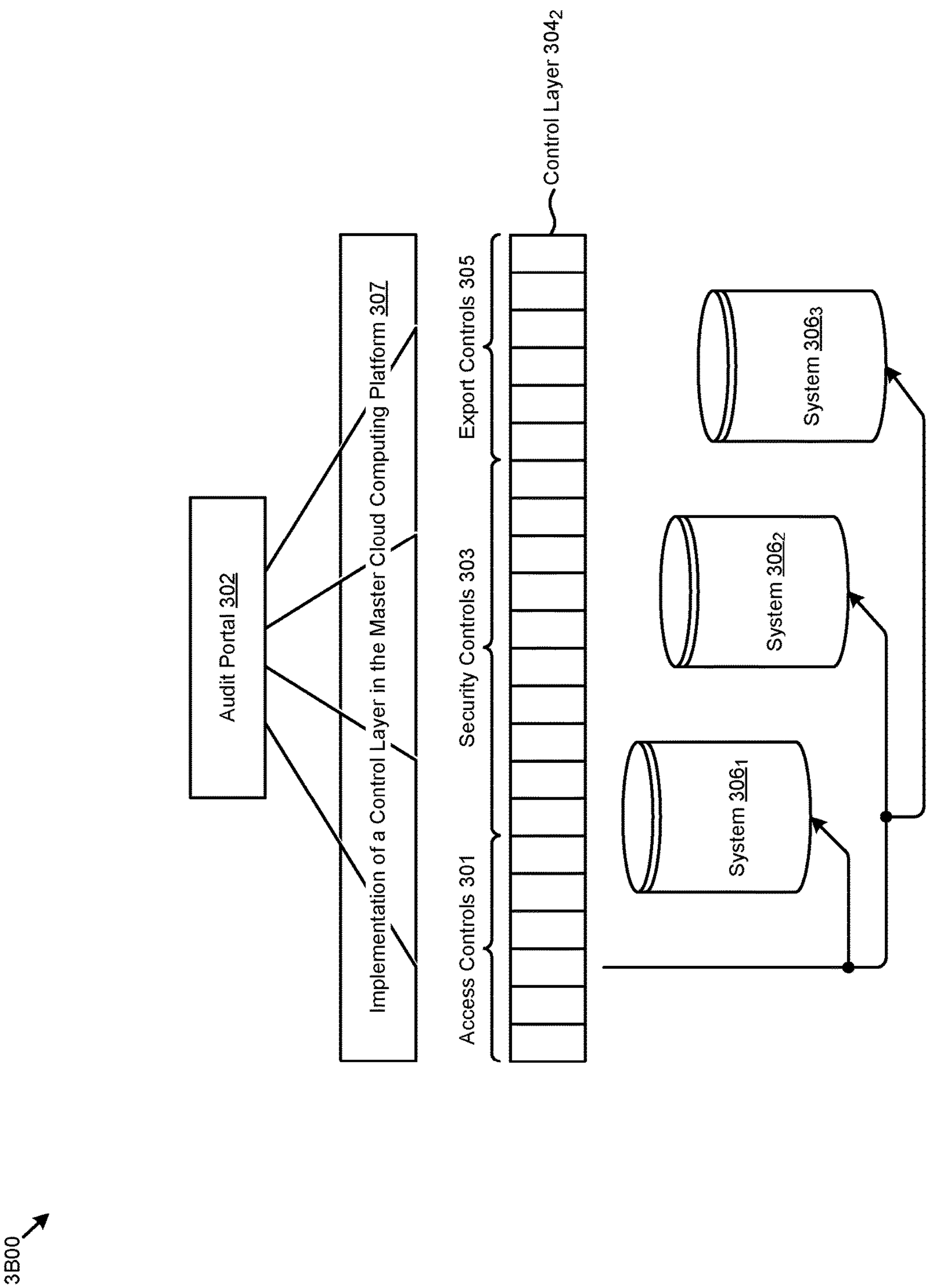
FIG. 3B depicts a computer-implemented data event auditing technique as used in systems that perform heterogeneous regulatory control compliance monitoring and auditing, according to an embodiment.

FIG. 3B depicts a computer-implemented data event auditing technique 3B00 as used in systems that perform heterogeneous regulatory control compliance monitoring and auditing. As an option, one or more variations of computer-implemented data event auditing technique 3B00 or any aspect thereof may be implemented in the context of the architecture and functionality of the embodiments described herein. The computer-implemented data event auditing technique 3B00 or any aspect thereof may be implemented in any environment.

Enterprises typically characterize their own policies and procedures and underlying controls based on provisions described in national or international regulatory standards. Often, the enterprises are required to submit self-compliance evidence to regulatory authorities. In some cases, third-party auditors are engaged to assess implementation of the controls. Further, in some cases, third-party auditors are engaged to assess actual compliance with the international and/or national regulatory standards. Upon determining compliance of the controls with the standards, auditors typically provide a report or a certificate that indicates compliance of the controls. Audits, are usually respectful of a particular "point-in-time", and often involve merely a sample of compliance data. For example, an audit might cover a 6-months-prior review period to determine the extent to which various compliance controls had been observed. As an example, an audit might look at historical data to determine accesses and/or movement or communication of such specific data. The audit report might include findings as to where the data had been moved or communicated, how the data had been moved or communicated, and/or what changes had been made to access rights/privileges pertaining to the data.

As can be understood, data moves constantly within and outside of an enterprise so, for even a small enterprise, a showing of compliance to the regulator on an ongoing basis becomes a very dubious task because such a point-in-time audit report merely reports on compliance conditions summarized as of one particular day. For example, if an external auditor is tasked to issue a compliance report for "December 31", the enterprise might provide a 6-months-prior review period of the data, (e.g., from June 30 onwards). The auditor takes samples from the compliance data of that 6-month period.

In the embodiment of FIG. 3B, the system provides an audit portal 302 that allows auditors and/or regulators and/or an entities own management team to gain access to instantaneously gauge compliance/non-compliance with respect to the then current set of defined controls and measures. Specifically, and as shown, control measures pertaining to regulatory controls of the control layer can be captured in real time or in near real time. Because regulators can have access to instantaneously-gauged compliance, the disclosed system delivers the advantage of eliminating reliance on external auditors as well as delivering the advantage of reducing or eliminating errors in interpretation. Using certain embodiments of the disclosed techniques, an enterprise can perform its own self-auditing to check whether its business practices are compliant with regulatory standards and/or if compliance is trending towards an "out of compliance" situation, in which case the enterprise itself can remediate as needed so as to stay in compliance.

Control layer 304$_1$ as shown and described in FIG. 3A can implement access controls 301, and/or security controls 303, and/or export controls 305, as examples. Alternatively, and as noted in FIG. 3B, some portions of the control layer can be implemented in a first layer (e.g., control layer 304$_2$), while other portions of the control layer are implemented in a second layer, such as the implementation of a control layer in the master cloud computing platform 307.

More particularly, in some embodiments, an implementation of a control layer in the master cloud computing platform 307 can be configured to implement all or portions of the audit portal 302. In some implementations, the audit portal includes a reporting tool to permit an auditor to review (e.g., in real time), aspects of compliance with respect to any one or more of the aforementioned international and national standards. In the event that the reporting tool determines that the business operations of the enterprise are not compliant with the international or national standards, the reporting tool can raise an alert (e.g., a non-compliance alert, or a non-compliance threshold alert) and/or provide one or more corrective actions with the goal of remediating the situation so as to bring the business practices into compliance with the international or national standards and/or into compliance with an enterprise's own internal compliance standards. Such corrective actions can be managed using a front-end user interface that is made accessible to employees of the enterprise.

For example, the front end user interface can include aspects of the customer's own specific implementation of controls and/or remediation activities. Such a front end user interface can be embodied as yet a further layer. In some cases, portions of the additional layer are provided in and by the shown master cloud computing platform. In some cases, the corrective actions can be generated by the master cloud computing platform automatically or, in certain other cases, corrective actions might be implemented by changes in the underlying processes (e.g., process1, process2).

Consider the following example scenario: Based on national or international standards, an enterprise might be prohibited from sharing IP addresses that lie outside a certain geographical territory. Configurations and/or settings pertaining to the enterprise's implementation of its respective processes can reflect such a regulation. If the enterprise acquires a new company that is located outside of the aforementioned certain geographical territory, then the processes might need to be modified. Thus, the corrective action in this scenario might be to implement a modification of the underlying processes and/or to modify the front end of the interface.

FIG. 3B illustrates merely some implementation details pertaining to systems that map heterogeneous data representations of regulations into one or more control layers. The embodiment shown in FIG. 3B is merely one example partitioning. Other partitionings are possible, one of which is shown and described as pertains to FIG. 4.

Figure 4:
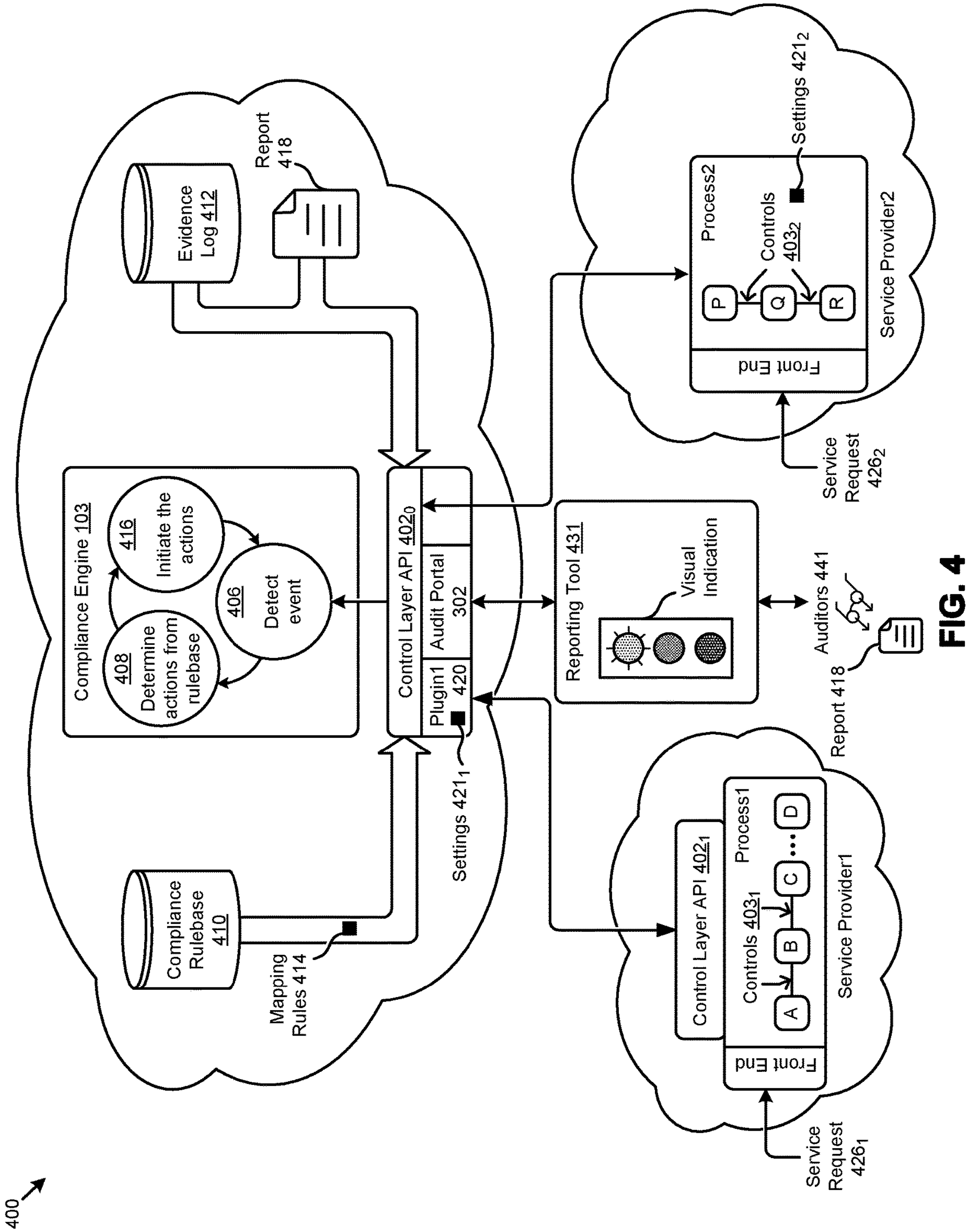
FIG. 4 presents a block diagram showing a system partitioning to facilitate intersystem interactions in heterogeneous regulatory control compliance monitoring and auditing environments, according to an embodiment.

FIG. 4 presents a block diagram showing a system partitioning 400 to facilitate intersystem interactions in heterogeneous regulatory control compliance monitoring and auditing environments. As an option, one or more variations of system partitioning 400 or any aspect thereof may be implemented in the context of the architecture and functionality of the embodiments described herein. The system partitioning 400 or any aspect thereof may be implemented in any environment.

In this partitioning, the shown compliance engine 103 communicates with service provider1 and service provider2 over one or more control layer application programming interfaces (APIs). Specifically, and as shown, compliance engine 103 communicates over a control layer API 402$_0$ that interfaces with service provider1 over control layer API 402$_1$. Also, as shown, compliance engine 103 communicates over control layer API 402$_0$ that interfaces with service provider2 natively, without use of a separate control layer situated in service provider2. In operation, service provider1 and service provider2 independently receive service requests (e.g., service request 426$_1$ or service request 426$_2$) through a front end that is configured as pertains to the specific service or services being provided (e.g., financial services, bug tracking services, healthcare data management services, etc.). Furthermore, service provider1 and service provider2 independently service the incoming service requests through respective processes (e.g., process1, process2) that implement sequences of data access activities or data manipulation activities.

Any of such processes might comprise subprocesses (e.g., such as the shown subprocess "A", subprocess "B", subprocess "C", . . . , subprocess D; subprocess "P", subprocess "Q", subprocess "R", etc.), and any subprocess and/or interfaces between subprocesses might include controls at various points either within the subprocesses, or between the subprocesses as shown. In this specific example, a first set of controls $403_1$ pertaining to process1 includes observation points between subprocess "A" and subprocess "B" and between subprocess "B" and subprocess "C". A second set of controls $403_2$ pertaining to process2 has observation points between subprocess "P" and subprocess "Q", and between subprocess "Q" and subprocess "R".

The occurrence of a controlled event either within the subprocesses or between the subprocesses might be detected, classified and forwarded using a respective API. For example, the shown process1 might send data to a foreign IP address or to an IP address outside of its home domain. This event can be classified by using a particular API call from the control layer API $402_1$. If the event is classified or otherwise deemed to be an event that corresponds to some form of a control (e.g., sending data to a foreign IP address), then another call to the control layer API $402_1$ might be made to form a log entry that can in turn be communicated over yet a third API call of control layer API $402_1$ so as to invoke processing of the event by the compliance engine 103. This specific case of communication of an event to be logged can be processed by the compliance engine as follows: (1) monitoring process 406 detects the occurrence, (2) action determination process 408 determines applicable compliance rules and/or compliance actions (e.g., by accessing the compliance rulebase 410), and (3) action process 416 initiates the applicable compliance actions. Continuing this example, the action taken might be to generate a compliance report 418 and/or to store the event log entry in a log such as the shown evidence log 412. The evidence log can be used in conjunction with reporting tool 431 in many embodiments. In a first embodiment the mere identification of an event to be captured (e.g., as an entry into the evidence log) might precipitate reporting actions based on the identified action along. As one example, if trade communications with a certain set of nations where prohibited by regulation (e.g., possibly due to a trade embargo), and a trade communication with one of the prohibited nations is detected (e.g., by compliance engine 103), then a report can be produced even before the offending event is logged into evidence log 412. In another scenario, upon detection of the occurrence of an event, characteristics of the event might be logged into the evidence log without producing a report at that time, but rather, deferring reporting until some later time, such as when an auditor interacts with the reporting tool 431. In still other scenarios, upon detection of an event, a report can be produced contemporaneously with logging the detected event in the evidence log. An auditor or regulator or administrator or any user in any role can request a report, or reports can be automatically generated on a periodic basis. Furthermore, the behavior of the compliance engine (e.g., how to handle detected events) and/or the reporting tool (e.g., when and under what circumstances to generate a report) can be configured by an auditor or regulator or administrator or any user in any role. Such a configuration might be stored as a setting or might be stored in a compliance rulebase.

The determination of which action or actions to take based on a detected event might include consulting a set of mapping rules 414 (e.g., to determine actions to take and their order of initiation). The specific actions to take might be determined wholly or in part based on consideration of settings. Furthermore, the aforementioned settings might be incorporated into a plug-in that is specific to a particular service provider.

In some scenarios, the occurrence of a controlled event either within the subprocesses or between the subprocesses might span subprocesses. For example, if process2 is defined to flow from subprocess "P" to subprocess "Q" to subprocess "R" but it is detected that a traversal through process2 went from subprocess "P" directly to subprocess "R" (i.e., without traversing through subprocess "R, then such an occurrence itself might be might, detected classified and forwarded using a respective API.

In the embodiment of FIG. 4, a service provider1 has its corresponding plugin1 420 having settings $421_1$ that are hosted within or accessible by plugin1 420, whereas service provider2 communicates with control layer API $402_0$ through direct communication between process2 and the control, without use of a plugin. In such cases, the service provider layer can store its own instance of settings $421_2$. As such, characteristics of the interface between a particular service provider and a centralized compliance engine can derive, wholly or in, part from implementation of the service provider's corresponding plug-in and/or its corresponding settings. Furthermore, any aspect or aspects of communication and/or formatting, and/or detection of events, and/or determination of actions to take can be derived from the mapping rules 414 of the compliance rulebase 410. Any variations of the partitioning and/or deployment of all or portions of the control layer API, and/or all or portions of instances are possible.

As shown, the control layer API $402_0$ includes an interface to audit portal 302. The audit portal in turn provides an interface to reporting tool 431. The reporting tool can be operated by one or more auditors 441. In some embodiments, the reporting tool includes a user interface within which a visual indication of compliance can be displayed. One possible example of such a visual indication is an image of a traffic control signal such as a "stop light".

FIG. 4 illustrates one possible partitioning of components that perform mapping of heterogeneous data representations of regulations into a common data format for auditing compliance/non-compliance of acts that are subject to regulations. In some scenarios, the components perform mapping of heterogeneous processes traversals into a common sequencing format that can be compared to any other sequencing traversals. For example, a first service provider might perform a process in a manner that is prescribed and/or documented as per ISO 9001 requirements, whereas a different service provider might perform the same (or intended to be the same) process in a manner that is contrary to the process that is prescribed and/or documented in ISO 9001. To detect the unwanted variation, the compliance engine can receive a set of first occurrence indications of performance of the first compliance process. A first set of mapping rules that defines how to convert the first occurrence indications of the first compliance process into a common sequencing format is consulted. Upon receiving second occurrence indications of the second compliance process, a second set of mapping rules that defines how to convert the second occurrence indications into the common sequencing format is consulted. Variations in processing between the two service providers can be detected by comparing the two sets of occurrence indications that are stored in the aforementioned common sequencing format. If a difference is detected, the occurrence of the detected difference can be logged and/or reported.

Partitioning of components and their interactions with other components can be varied from the partitioning and interactions as shown in FIG. 4. One possible alternative partitioning into components and interactions between those components is given in the following FIG. 5.

Figure 5:
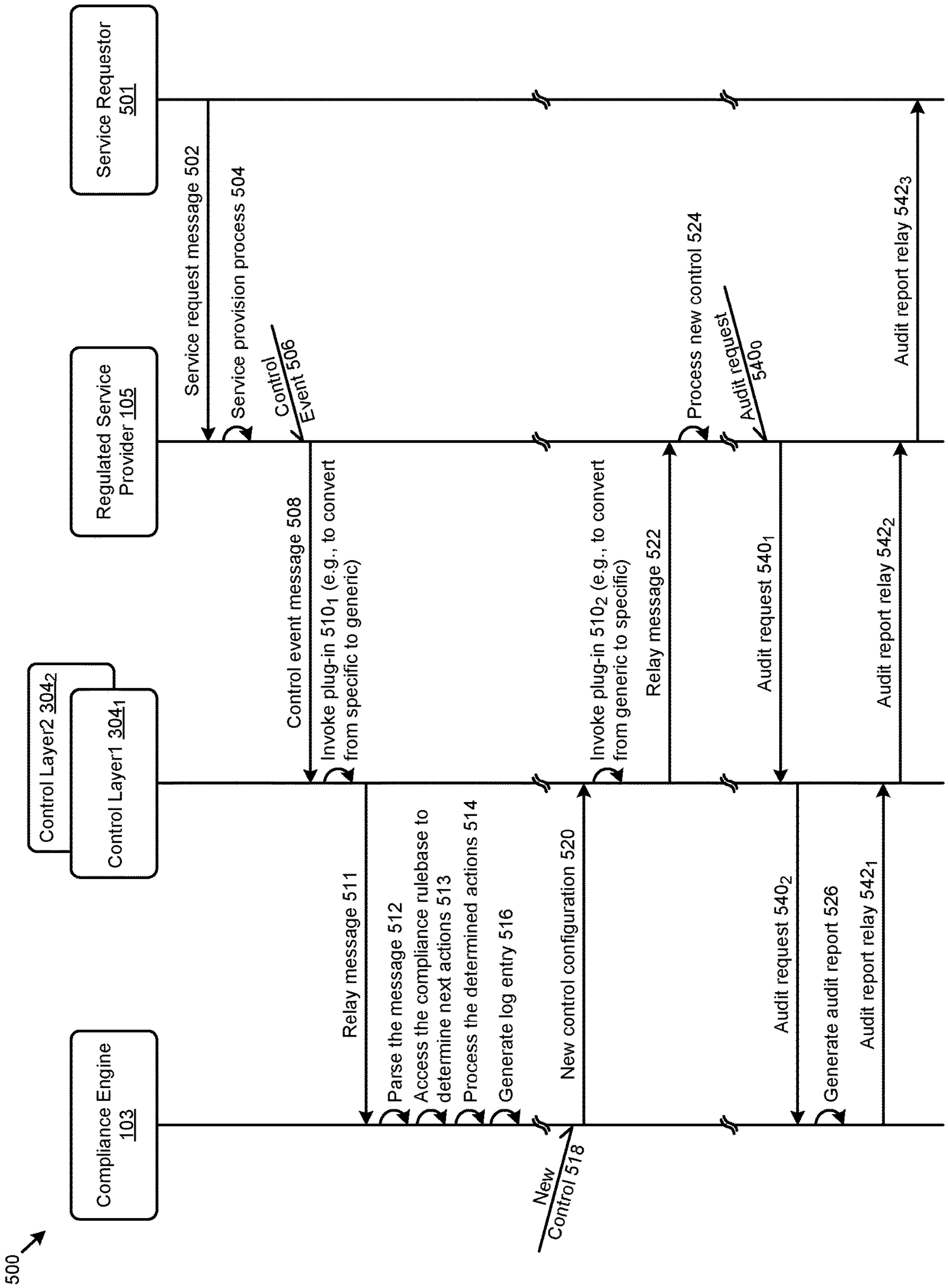
FIG. 5 presents a ladder diagram showing a component-to-component interaction protocol as used in heterogeneous regulatory control compliance monitoring and auditing environments, according to an embodiment.

FIG. 5 presents a ladder diagram showing a component-to-component interaction protocol 500 as used in heterogeneous regulatory control compliance monitoring and auditing environments. As an option, one or more variations of component-to-component interaction protocol 500 or any aspect thereof may be implemented in the context of the architecture and functionality of the embodiments described herein. The component-to-component interaction protocol 500 or any aspect thereof may be implemented in any environment.

One way to implement mapping functions that turn heterogeneous data representations into acts performed by different regulated service providers is to introduce one or more control layers between each regulated service provider 105 and a compliance engine 103. The shown protocol commences when a service requestor 501 sends a service request message 502 to regulated service provider 105. Responsive to a service request message, the regulated service provider initiates a service provision process 504 that corresponds to the received service request. Performance of the service provision process 504 might be subjected to one or more regulatory controls. If so, performance of the service provision process 504, might raise a control event 506. The control event in turn might cause an API to be called that sends a control event message 508 to the compliance engine through a control layer (e.g., control layer $\mathbf{304}_1$, or control layer $\mathbf{304}_2$).

In this particular embodiment, the control layer invokes a plug-in $\mathbf{510}_1$ that corresponds to the particular regulated service provider. The plug-in itself is configured to be able to convert aspects of communication and/or data formatting into a common data format. Therefore, the control layer, possibly in coordination with its plug-in, can form a relay message 511 in a common format such that the compliance engine can parse the message (e.g., at operation 512), at least to the extent that the compliance engine can index into the compliance rulebase to determine actions to take (e.g., at operation 513), which actions are based at least in part on the contents of the message. In many cases, and in the embodiment shown, when the compliance engine 103 continues to processes the message and/or initiates processing of the determined actions (e.g., at operation 514) it might also generate a log entry (e.g., at operation 516). The log entry can be saved using any storage facility so as to retain the entry for a period of time. Accordingly, a logged entry can be accessed using a compliance/auditing interface such as an audit portal.

This architecture involving one or more layers between each regulated service provider 105 and a compliance engine 103 also serves for updating data structures and/or code that corresponds to new controls. New controls might be ones that apply to a previously codified regulation, or the new controls might correspond to a new corpus of regulations. As shown, when a new control 518 is identified, aspects of the new control and/or its configuration can be relayed (by message 520) from the compliance engine to a target control layer. As earlier indicated a particular control layer can include a plug-in, and as such, aspects of the new control and/or its configuration can be incorporated into a plug-in of a target control layer.

In some cases, and as shown, a particular plug-in $\mathbf{510}_2$ might be preconfigured to be able to accept a new control configuration and convert from the generic format of the regulation into a specific format as pertains to operation of the respective regulated service provider. Once converted, the plug-in or other functional component of the control layer can send a relay message 522 to the regulated service provider, which in turn processes the new control (e.g., at operation 524).

In yet other cases, the protocol can be used to request and process an audit report. Specifically, an initial audit request $\mathbf{540}_0$ might be raised from any source. The audit request can be relayed (e.g., via audit request $\mathbf{540}_1$) to the control layer, which in turn relays the audit request (e.g., via audit request $\mathbf{540}_2$) to the compliance engine. The compliance engine generates an audit report (e.g., at operation 526) after which an audit report relay $\mathbf{542}_1$ is relayed (via audit report relay $\mathbf{542}_2$ and audit report relay $\mathbf{542}_3$) to the requestor.

The shown operation 513 to access a compliance rulebase might include accessing a mapping table. The mapping table in turn describes how to map certain heterogeneous data representations into a common data representation format and/or how to map aspects of a control event message into computerized actions. One possible embodiment of a mapping table is provided in FIG. 6.

FIG. 6 depicts a mapping rule implementation 600 for use in systems that perform heterogeneous regulatory control compliance monitoring and auditing. As an option, one or more variations of mapping rule implementation 600 or any aspect thereof may be implemented in the context of the architecture and functionality of the embodiments described herein. The mapping rule implementation 600 or any aspect thereof may be situated in any environment.

FIG. 6 illustrates one aspect pertaining to mapping heterogeneous data representations of regulations into a common set of processing characteristics for auditing compliance/non-compliance of acts that are subject to the regulations. Specifically, the figure is being presented with respect to its contribution to addressing the problem of federating data formats used in auditing compliance/non-compliance of acts that are subject to regulatory controls.

The shown mapping table 602 is merely one technique for mapping events from heterogeneous systems into source-specific compliance actions and/or for mapping heterogeneous compliance data into a common data format. When a message or compliance data is received from a particular source, the source itself (e.g., the URL of the source) might be used to determine the provenance of the sent message or sent compliance data. Additionally, using the mapping table, the underlying nature or purpose of the compliance data can be characterized (e.g., in a column of the mapping table). As an example, the compliance data might include an explicit indication of such a purpose. It often happens that the nature or purpose of the compliance data can be known based at least in part on the intended destination of the compliance data. Thus, knowing the source and some characteristic of the nature or purpose of the received compliance data, the mapping table can be used to determine which compliance regulations and/or respective controls might apply and/or what compliance actions are to be carried out with respect to the received compliance data and/or performance of any of the controls. In many cases, the compliance action is a logging action. In many cases, a target format is specified. In relatively smaller systems, there might only be one target format defined (e.g., CommonFormat1, as shown), however in some larger systems, two or more target formats can coexist.

The embodiment shown in FIG. 6 depicts an example of upload processing and test suite processing. In the former example of upload processing, the mapping table indicates that control "C1" and control "C2" are to be applied. Applying a control might include application of checks that emit results. For example, a control "check if the data was encrypted" might emit a log item such as "ObjectA was encrypted", or "ObjectA was NOT encrypted". Such emissions might need to be logged for later use during auditing. As such, a mapping table includes an indication as to which emissions (e.g., emission of type "E1", emission of type "E3", etc.) are to be logged.

The mapping table further specifies controls in the form of specific tests to be performed. In this example, when data is received from "URL2" and the item received from "URL2" indicates that controls in the form of tests are to be performed, the mapping table is consulted to determine which tests (e.g., test "T1", test "T2", etc.). Moreover, the mapping table indicates which results are to be stored. As shown, the results of performing test "T1" as well as the results of performing test "T2" are to be logged.

The mapping table is merely one example of codifying compliance regulation rules. The example rules depict two different processes and their respective mapped-to compliance regulations and respective compliance actions. Other processes are possible as is the format of the mapping table itself. Strictly as illustrations, the foregoing processes of upload and test (e.g., as shown in the first row and the second row of mapping table 602) are depicted as use cases in the FIG. 7A, FIG. 7B, and FIG. 8.

Figure 7A:
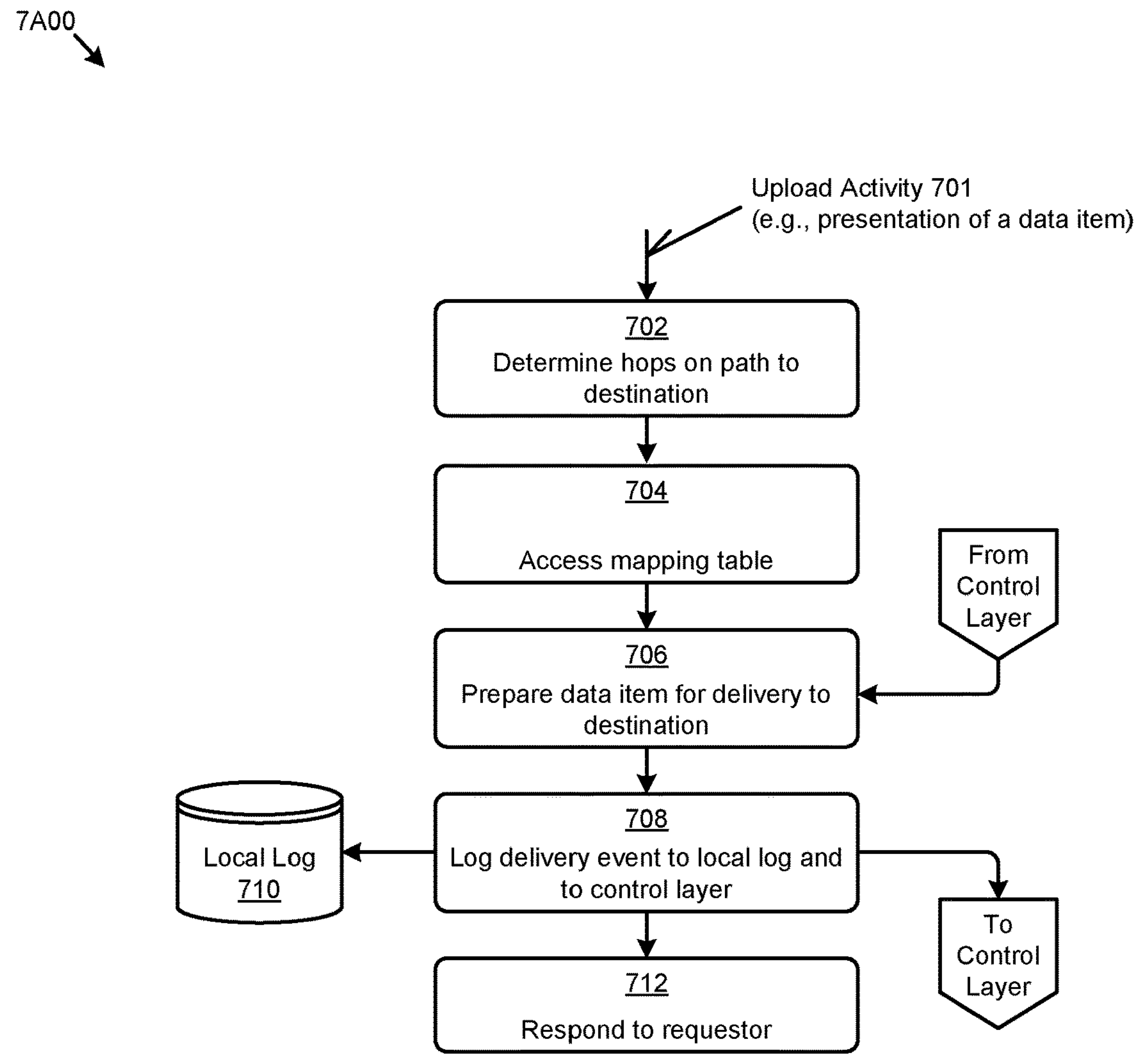
FIG. 7A is a flowchart depicting a data handling use case for implementation in systems that perform heterogeneous regulatory control compliance monitoring and auditing environments, according to an embodiment.

FIG. 7A is a flowchart depicting a data handling use case 7A00 for implementation in systems that perform heterogeneous regulatory control compliance monitoring and auditing environments. As an option, one or more variations of data handling use case 7A00 or any aspect thereof may be implemented in the context of the architecture and functionality of the embodiments described herein. The data handling use case 7A00 or any aspect thereof may be implemented in any environment.

FIG. 7A illustrates one aspect pertaining to mapping heterogeneous data representations of regulations into a common data format for auditing compliance/non-compliance of acts that are subject to the regulations. Specifically, the figure is being presented with respect to its contribution to addressing the problem of federating data formats used in auditing compliance/non-compliance of acts that are subject to regulatory controls.

The shown data handling use case 7A00 pertains to a flow for handling an uploaded data item. The flow is initiated upon occurrence of an indication of upload activity 701. At step 702, the path to the destination of the data item pertaining to the upload activity is determined. More specifically, the destination URL of the data item is determined, possibly from a portion of payload of an incoming message. In a particular upload scenario, data of certain types might be regulated under international trafficking in arms regulations (ITAR), and as such the movement of data might be restricted under such ITAR controls. A user might not know precisely what route or hops might be taken to accomplish an upload. For example, a user might not know of there a middleware server, or mirror server in an ITAR-subject jurisdiction that might be used as a hop on a path to an upload. Accordingly, at step 702, the network hops on the network path to the destination is determined and the hops are checked. In some cases, the upload would be prohibited. In other cases, the hops to the destination are controlled (e.g., so as to avoid ITAR-violating transmission of data), and in other cases, the data item is modified before transmission so as to no longer be subjected to ITAR regulations. Such pre-transmission processing of a data item need not be specific to ITAR. For example, some jurisdictions or regions might have jurisdiction- and/or region-specific regulations, any of which jurisdiction- and/or region-specific regulations might be stored in or referenced by an instance of the compliance rulebase 410 of FIG. 4.

At step 704, a mapping table is consulted. In this example, rows of the mapping table that pertain to upload processing are accessed. By looking at the contents of the rows, a set of applicable compliance regulations and/or respective control can be known. An additional access to data or code of the control layer is made. The data or code of the control layer defines how the upload should be processed and at step 706, the data item is prepared for delivery. Strictly as an example, the data item might be subject to control "C1" that specifies how the data item is to be encrypted. As well, the data item might be subject to control "C2" that specifies how the data item is to be communicated to its intended destination. Thus, in accordance with control "C1" and control "C2" the data is uploaded. During the processing of control "C1" and control "C2", the controls themselves might emit data that is to be used in compliance auditing. As such, at step 706, the fact of performance of the control and or any emissions from the controls are stored for subsequent access. In this embodiment the fact of performance of the control is sent to the control layer and to a local log before responding to the upload requestor (at step 712). A response to the upload requestor might be merely to advise the requestor that the upload request has been successfully processed in accordance with whatever controls were processed.

In this embodiment, any emissions from the controls are logged (at step 708) to a local log 710, however, in many embodiments, the fact of performance of the control and or any emissions from the controls are logged to an audit portal log in of centralized logging facility, possibly as implemented by an audit portal logging facility situated in a master cloud computing platform. One implementation of an audit portal logging facility situated in a master cloud computing platform is given in FIG. 7B.

Figure 7B:
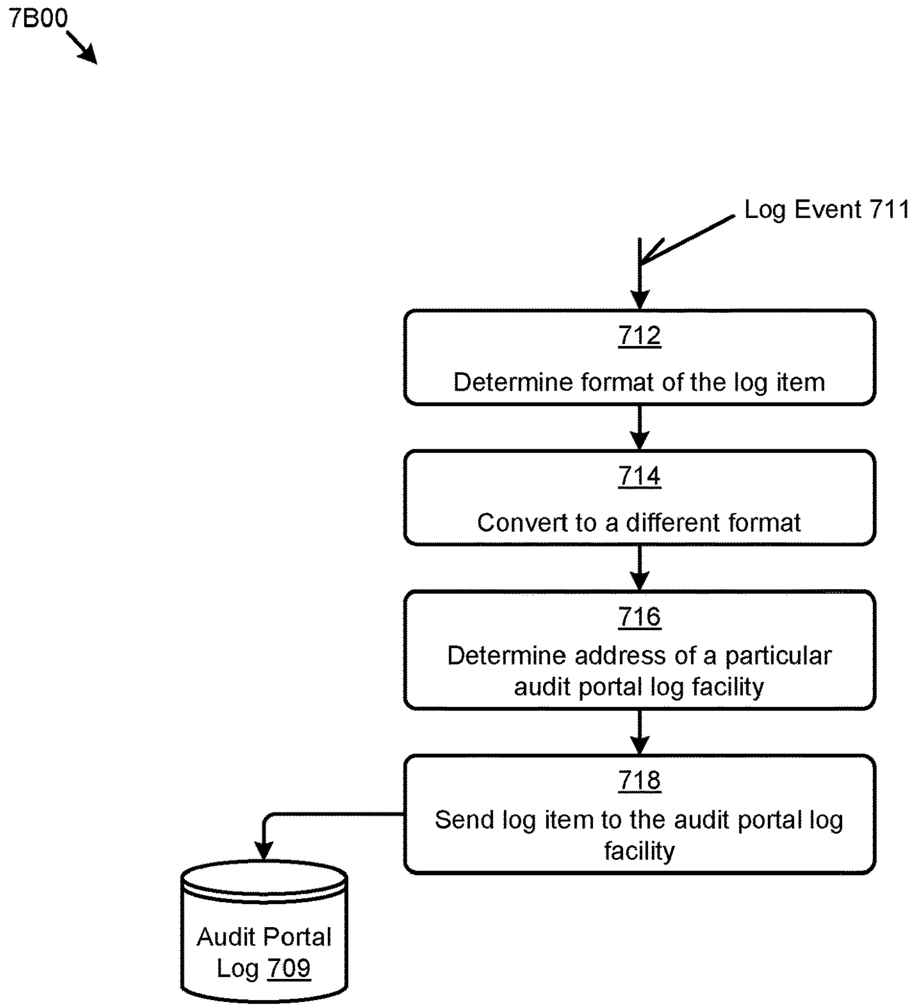
FIG. 7B is a flowchart depicting log event processing, according to an embodiment.

FIG. 7B is a flowchart depicting log event processing 7B00. As an option, one or more variations of log event processing 7B00 or any aspect thereof may be implemented in the context of the architecture and functionality of the embodiments described herein. The log event processing 7B00 or any aspect thereof may be implemented in any environment.

As shown, the log event processing flow is entered upon occurrence of a log event 711. The log event might be raised by occurrence of a message. At step 712, the format the log item is determined. Specifically, based on the sender and/or based on any indication in a mapping table, the incoming format of the log item is determined. Furthermore, based on the sender and/or based on any indication in a mapping table, a target format of the log item is determined. Continuing the example above, and the specific embodiment of the mapping table of FIG. 6, the target format of the log item is "CommonFormat1". At step 714, the log item in its source format is converted into the target format, thus making the log item ready for sending to an audit portal log 709. However, in some cases, in particular when a compliance engine handles compliance and auditing services for many different systems, many different audit logs are maintained.

Accordingly, at step 716, the applicable audit log facility is determined and at step 718 the converted log item is sent to the determined audit portal log facility for entry into an applicable instance of an audit portal log 709.

The foregoing description of an upload use case is merely one possible use case. The same or similar techniques can be used in a variety of additional uses cases where some aspects of data handling are subject to regulatory control. One such additional use case pertaining to automated testing is shown and described in FIG. 8.

Figure 8:
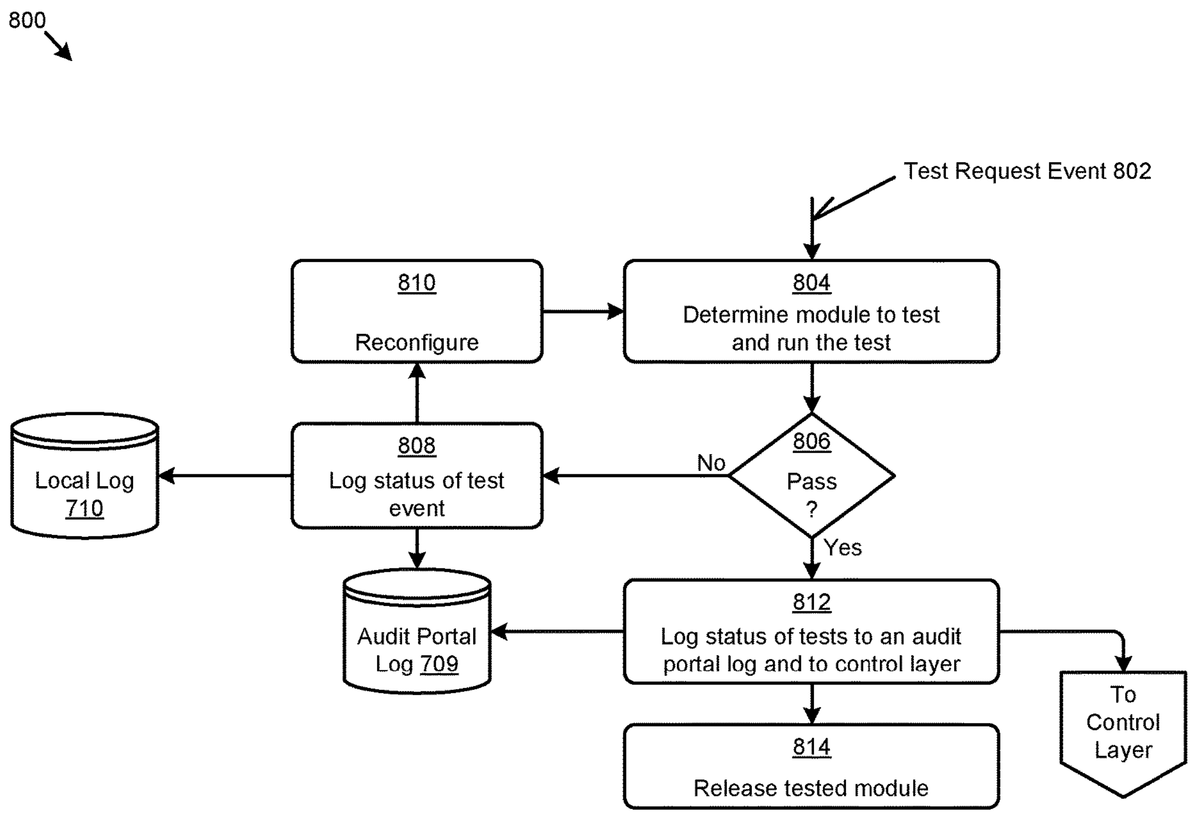
FIG. 8 is a flowchart depicting a test compliance use case as implemented in systems that perform heterogeneous regulatory control compliance monitoring and auditing environments, according to an embodiment.

FIG. 8 is a flowchart depicting a test compliance use case 800 as implemented in systems that perform heterogeneous regulatory control compliance monitoring and auditing environments. As an option, one or more variations of test compliance use case 800 or any aspect thereof may be implemented in the context of the architecture and functionality of the embodiments described herein. The test compliance use case 800 or any aspect thereof may be implemented in any environment.

FIG. 8 illustrates a use case where software modules are to be tested for compliance on a regular, repeating basis. For reasons of compliance, the occurrence of performance of the test procedures and the results of the test(s) are to be logged such that an audit of the occurrence of the test procedures and corresponding test results can be performed at will by a third party (e.g., by a regulatory control entity or by a third-party auditor).

In this use case, the flow is initiated upon occurrence of a test request event 802. Such an event might be raised by a message sent to the master cloud computing platform. Based on the message and/or any payload of the message and/or any other data item that pertains to the test request event, step 804 determines the specific module to be tested and what tests are to be run. In one specific case, a mapping table is used to determine the tests to be run. Continuing with the sample mapping table of FIG. 6, if the test request event 802 were raised by a source at "URL2", then controls "T1" and "T2" (e.g., test "T1" and test "T2") are executed so as to be in compliance with the applicable regulations. After the test or tests have been performed on the determined module, a determination is made as to the "Pass" or "Fail" results of the test or tests. The "No" path of decision 806 is taken if the result of the test or tests was not "Pass". The status of the test (e.g., "Fail" or "Incomplete" or "Inclusive, etc.) is logged at step 808 to a local log 710 (e.g., that is not published for auditing use) and/or to an audit portal log 709 (e.g., that is published for auditing use). The determination of which log(s) to use and/or the behavior of the compliance engine (e.g., how to handle log events) and/or the reporting tool (e.g., when and under what circumstances to generate a report) can be configured by an auditor or regulator or administrator or any user in any role. Such a configuration might be stored as a setting or might be stored in a compliance rulebase. Strictly as one example, when testing "patches" to code modules, it often happens that such patches are purposely supported (e.g., supposed to function) in certain environments and not supported in other environments (e.g., for managing backward compatibility, etc.). In such cases a "Fail" status might be intended by the patch designer and thus, might be logged to a local log 710 and the "Fail" status might not be logged to an audit portal log 709.

In accordance with any of the aforementioned logging configurations, after carrying out the logging, processing moves to a reconfigure step 810. Such a reconfigure step might involve modifying the test setup or test environment, and/or such a reconfigure step might involve retrieval of a different version of the module to be tested. After the reconfiguration of step 810, processing returns to step 804.

In the event that the test or tests do pass, then the "Yes" branch of decision 806 is taken and at step 812 the occurrence of the performance of the test or tests and respective status of the test or tests is sent to the control layer. In some situations, and as shown, the status of the test or tests is also sent to the audit portal log 709. Releasing the tested module is then performed at step 814 to complete the pass through the flow. The flow can again be initiated upon occurrence of another test request event 802.

The foregoing use cases are merely two examples of situations where certain computer processing is subjected to regulatory controls and/or oversight. It frequently happens that one enterprise is subjected to multiple compliance, monitoring and auditing obligations, any of which derive from industry-specific standards and/or regulations. Any number of industry-specific standards and/or regulations can be implemented in a compliance engine, which in turn can be deployed within respective master cloud computing platforms. In fact, certain large enterprises might be engaged in a wide range of activities that are subjected to regulatory obligations. Some large enterprises are engaged in activities in multiple different jurisdictions. In some situations involving different jurisdictions, it can happen that the data that is processed within any particular master cloud computing platform might itself be subjected to jurisdiction-specific export restrictions. As such, an instance of a master cloud computing platform might need to be situated in that jurisdiction such that the data does not leave the jurisdiction. An example case of an enterprise that spans multiple jurisdictions that each enforce jurisdiction- and industry-specific regulations is depicted in FIG. 9.

Figure 9:
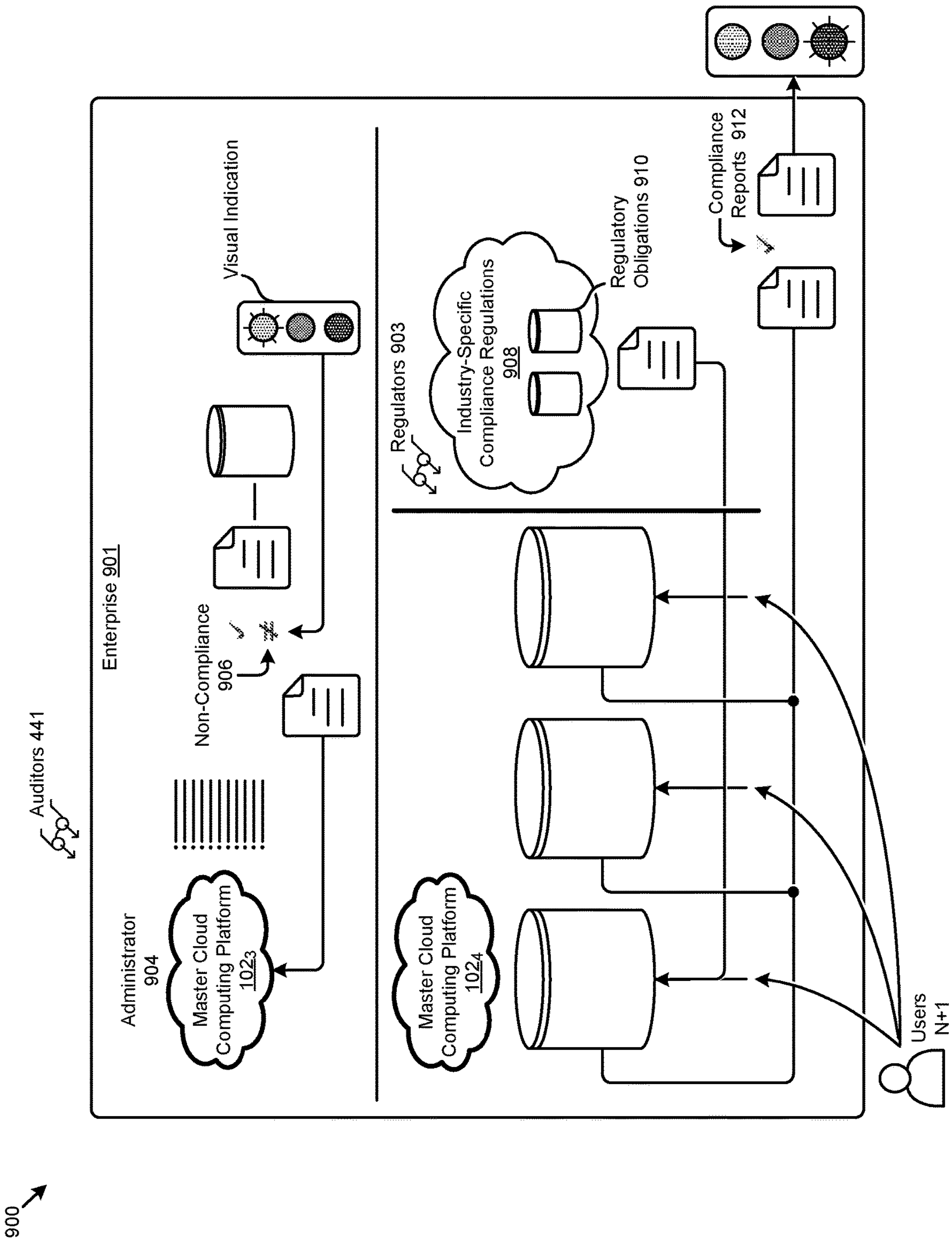
FIG. 9 is a block diagram of an enterprise that is subjected to multiple industry-specific compliance, monitoring and auditing obligations, according to an embodiment.

FIG. 9 is a block diagram 900 of an enterprise that is subjected to multiple industry-specific compliance, monitoring and auditing obligations. As an option, one or more variations of block diagram 900 or any aspect thereof may be implemented in the context of the architecture and functionality of the embodiments described herein. The block diagram 900 or any aspect thereof may be implemented in any environment.

In some embodiments, the disclosed technology is integrated within multiple instances of a master cloud computing platform that provides the compliance monitoring, checking, logging, and reporting functionalities in different jurisdictions.

In some embodiments, partitioning is such that multiple instances of a master cloud computing platform are implemented within the metes and bounds of an enterprise 901. For example, and as shown, the metes and bounds of enterprise 901 includes at least a partial implementation of the master cloud computing platform $\mathbf{102_3}$.in a first jurisdiction. Enterprise 901 also includes at least a partial implementation of the master cloud computing platform $\mathbf{102_4}$.in a second jurisdiction. This can be accomplished when the enterprise subscribes to the centralized cloud-based collaboration platform, at which point some portions of a master cloud computing platform are deployed to equipment owned and operated by, or otherwise under control of, the enterprise, even when the equipment owned and operated by the enterprise are situated in different jurisdictions.

In one scenario, an administrator 904 in a first jurisdiction can request a compliance report. The compliance report might indicate compliance or, as shown, the compliance report might indicate non-compliance 906. In this latter case (i.e., of non-compliance), the visual indication might change colors, or otherwise indicate the status of non-compliance.

More specifically, and as shown, the visual indication might be based on the color of traffic lights. A red traffic light indicates a non-compliant business operation and a yellow traffic light can indicate a potentially non-compliant business operation.

In some embodiments, reports can be requested and the corresponding visual indications can be viewed by employees or compliance team members of the enterprise or by regulators 903 (e.g., regulators as pertains to the particular industry, and/or regulators who enforce over particular jurisdictions or geographies). Upon viewing the traffic light, the requestors can review, vet and rectify the non-compliance as necessary.

In addition to providing "real time" compliance visibility or transparency as it relates to data protection, (e.g., security and privacy), the disclosed technology can provide "real time" compliance monitoring of the configuration/settings of the enterprise's implementation of its services. It will be appreciated by those skilled in the art that a particular service platform can have different settings and configurations for different enterprises. Moreover, as shown, different users (e.g., Users N+1) can interface with or within the enterprise 901 in many different ways. Any particular user may have user-specific configurations and/or settings. The configuration/settings can be associated with different industry-specific compliance regulations 908, which in turn may include any number of regulatory obligations 910 such as may be defined in connection with certain types of data and/or certain geographical location(s) associated with the data. The industry-specific compliance regulations 908 can be broken out into multiple storage locations, and any combination of industry-specific compliance regulations 908 and/or indications of performance to those industry-specific compliance regulations 908 can be combined into one or more compliance reports 912. Any of the industry-specific compliance regulations 908 and any corresponding regulatory obligations 910 might be specific to a particular geography or other type of regulatory jurisdiction.

Strictly as an example, a first user of the N+1 users might process X-ray data in accordance with regulatory obligations 910 that pertain to handling of a patient's X-ray data in a particular jurisdiction, whereas a second user might process patient medical billing data in accordance with regulatory obligations 910 that pertain to handling of a patient's medical billing data in a particular jurisdiction. The activities of both the first user and the second user might be subject to ongoing changes to configurations or settings of an enterprise's implementation of the compliance regulations and/or compliance regulation rules. A particular user (e.g., a system administrator or an enterprise employee, etc.) might or might not be aware of any such changes to configurations or settings as such changes to configurations or settings might be automatically applied.

Specifically, the disclosed technology provides an "auto compliance" functionality, wherein the disclosed technology is able to dynamically (e.g., "on the fly") reconfigure the configuration/settings of an enterprise's implementation of its processes and/or subprocesses to prevent the enterprise from being non-compliant. For example, assume the scenario where an employee is communicating with persons or entities domiciled or headquartered in a certain nation. The activities of such communications are logged/tracked using the herein-disclosed techniques. Further assume that the master cloud computing platform is made aware of a regulatory compliance control that specifies that trade communications with that certain nation are prohibited. In such a scenario, based at least in part on such "real time" compliance visibility, if the employee enters into discussions about trade, a regulator can inform the enterprise of the suspected or actual non-compliance issue.

Figure 10:
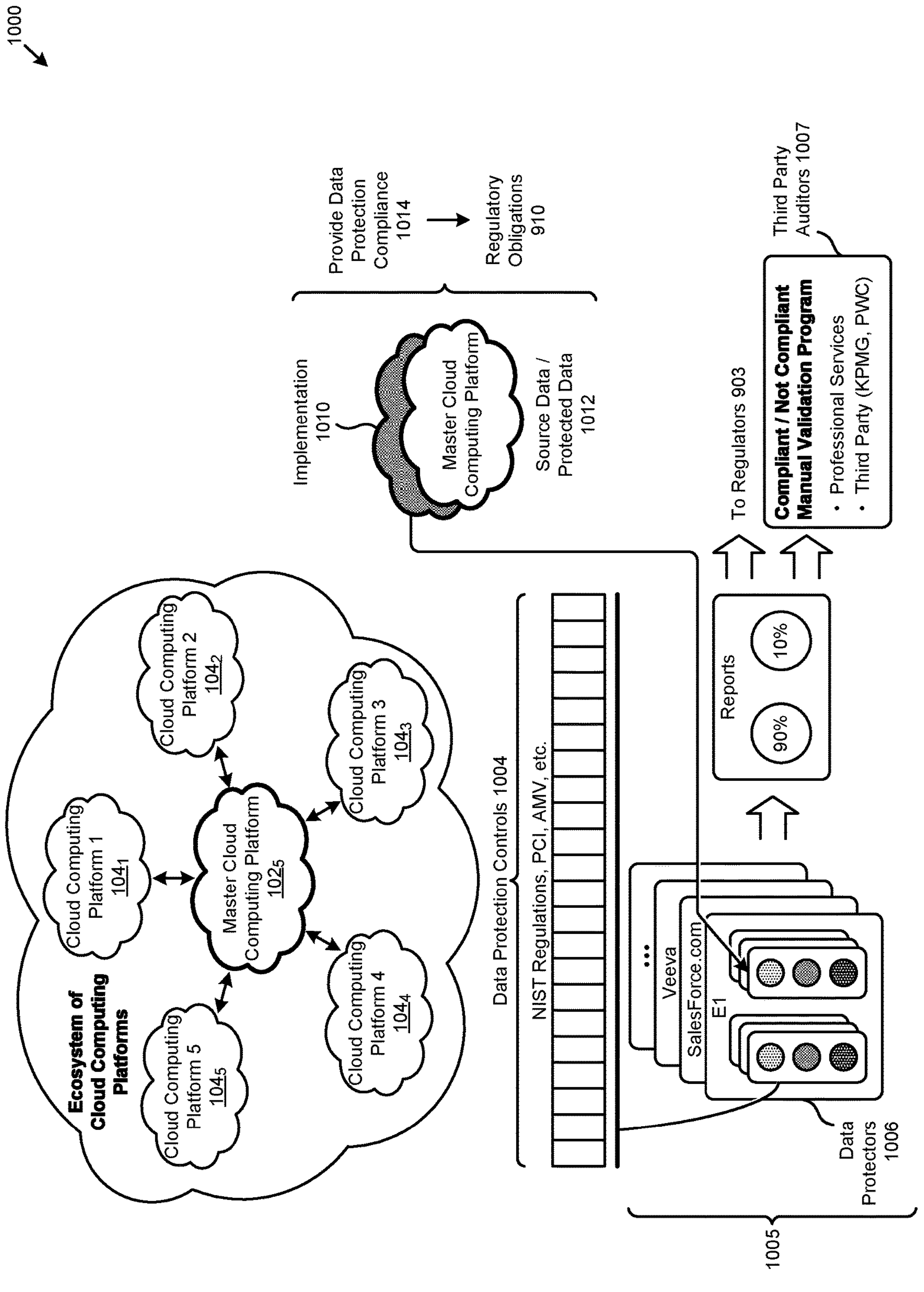
FIG. 10 depicts a hub-and-spoke ecosystem that implements heterogeneous regulatory compliance, monitoring and reporting, according to an embodiment.

FIG. 10 depicts a hub-and-spoke ecosystem 1000 that implements heterogeneous regulatory compliance, monitoring and reporting. As an option, one or more variations of hub-and-spoke ecosystem 1000 or any aspect thereof may be implemented in the context of the architecture and functionality of the embodiments described herein. The hub-and-spoke ecosystem 1000 or any aspect thereof may be implemented in any environment.

In some implementations, the master cloud computing platform $102_5$ serves as the "hub" of an enterprise's cloud ecosystem. Unstructured data can be transmitted to the master cloud computing platform and converted so as to comply with international and national standards. The master cloud computing platform can integrate with one or more software as a service (SaaS) features and platform as a service (PaaS) features as might be included in the enterprise's cloud ecosystem. This enables "real time" compliance visibility across the enterprise's cloud ecosystem.

Examples of industries where the disclosed technology can be used include financial services (such as banking/insurance/wealth management), biologic technology/pharmaceuticals, federal/state governments, healthcare, entertainment, automotive, power generation (such as gas/hydroelectric/fossil fuel/nuclear), and oil and gas. Each of these industries can be further subdivided into subcategories or subverticals. Further, compliance regulations for the industries can have different national and/or international standards.

In some embodiments, the disclosed architecture includes a master cloud computing platform that supports an enterprise's particular implementation 1010 of its master cloud computing platform for data protection. A particular implementation might include data protection controls as may be specified by NIST, and/or in accordance with PCI regulations or AMV regulations (as shown), and/or in accordance with POD-53 regulations and/or any other regulations, and/or in compliance with an enterprise's own defined control set. More specifically, such a particular implementation might provide data protection compliance 1014 by conforming to a corresponding set of regulatory obligations 910. Adherence to data protection compliance rules and regulations to protect source data and/or other protected data 1012 can be codified as data protection controls 1004 that are amalgamated in a control layer.

In some embodiments, in addition to the aforementioned control layer, the architecture can include an audit layer for third-party auditing. As shown in FIG. 10, an audit layer 1005 is implemented below the control layer. The dividing line between the control layer and the auditing later is depicted by the solid line just below the data protection controls 1004. In this particular embodiment, one or more data protectors 1006 use portions of the audit layer to manage particular kinds of data. Strictly as examples, FIG. 10 shows a generic enterprise "E1" that serves as a generic data protector. Certain types of data may be subject to very specific rules and regulations, and in some such cases an enterprise might avail of the services of specific data protectors. As shown, a data protector in the form of "SalesForce.com" serves to hold and protect sales- and contact-oriented data. In another situation, a data protector in the form of "Veeva" serves to hold and protect life sciences data.

Any data protector can implement all or some or none of the shown data protection controls 1004. Moreover, any data protector can implement industry-specific data protection that might relate to any of a range of applicable regulatory obligations 910. Still further, any data protector can generate reports that are suited for delivery to regulators 903 and/or third party auditors 1007. Such reports can be quantitative in nature, and might include a grade (e.g., 90% in overall categories, with 10% deficiencies in certain specific categories, etc.). The third-party auditors might, in turn, employ and/or direct the use of internal or external professional services to determine compliance or non-compliance with respect to applicable regulations. Such professional services can include use of an audit portal and/or use of manual validation procedures. In some cases, characteristics of the data retrieved from the audit portal might itself be scrutinized for compliance with various standards.

The shown regulators may define new regulations and/or any ongoing changes to existing regulations. Activities within the audit layer and activities within regulatory agencies can be performed synchronously with respect to the actions, or they may be performed asynchronously. As such, certain regulations (e.g., new regulations) can be configured so as to be implemented immediately and configured in the system to continue into the future, while activities of the auditing layer might be configured so as to provide reporting of prior in-effect rules and regulations. Access to audit data (e.g., evidence log data) by the audit layer and/or access to audit data by a regulatory agency can be associated with a particular user interface that is configured to perform/allow/deny specific functionalities such as authentication, set-up, data retrieval, and/or data updates.

Strictly as one example, an enterprise can set up a compliance environment through a series of questions (e.g., via a computerized form). In some embodiments, one or more components as given in the foregoing disclosed environments are sufficient to implement all or portions of controls that correspond to a given set of compliance regulations. In some embodiments, the tool can implement controls corresponding to the entirety of a given set of compliance regulations.

Figure 11:
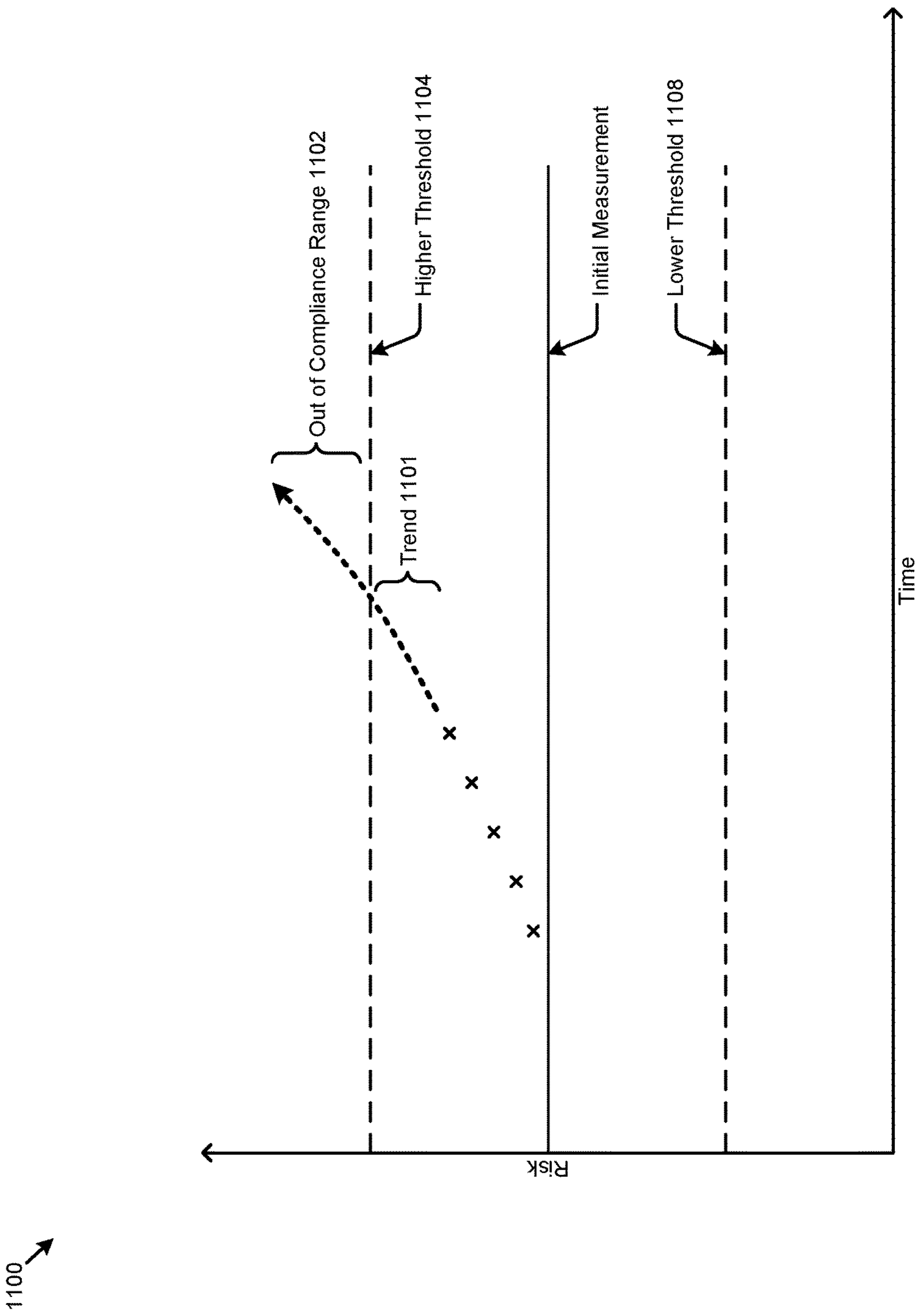
FIG. 11 depicts a compliance trend report as implemented in systems for heterogeneous regulatory compliance, monitoring and reporting, according to an embodiment.

FIG. 11 depicts a compliance trend report 1100 as implemented in systems for heterogeneous regulatory compliance, monitoring and reporting. As an option, one or more variations of compliance trend report 1100 or any aspect thereof may be implemented in the context of the architecture and functionality of the embodiments described herein. The compliance trend report 1100 or any aspect thereof may be implemented in any environment.

As heretofore discussed, various embodiments include one or more reporting capabilities Strictly as one example, FIG. 11 depicts a compliance trend report. Such a compliance trend report can be formed based on analysis of the evidence log. More specifically, examination of an evidence log might result in identification of any number of compliance events that have occurred over time. Such events can be plotted into a chart that characterizes the timing of each event with respect to a risk assessment of the corresponding event. In some cases, and as shown, a trend 1101 is formed. The trend might include a line or other graphical depiction that indicates the trajectory of the trend toward or away from a particular threshold. In the example of FIG. 11, the trend 1101 is toward higher risk, and the trend line is shown as surpassing a high risk threshold (e.g., the shown higher risk threshold 1104). As such remediation steps can be taken that cause controlled events to trend more toward a lower threshold 1108. The trend line might also show a region where, in absence of remediation and/or in absence of suppression of occurrences of the risk-introducing events, the trend will move into an out of compliance range 1102.

Additional Embodiments of the Disclosure

System Architecture Examples

Figure 12A:
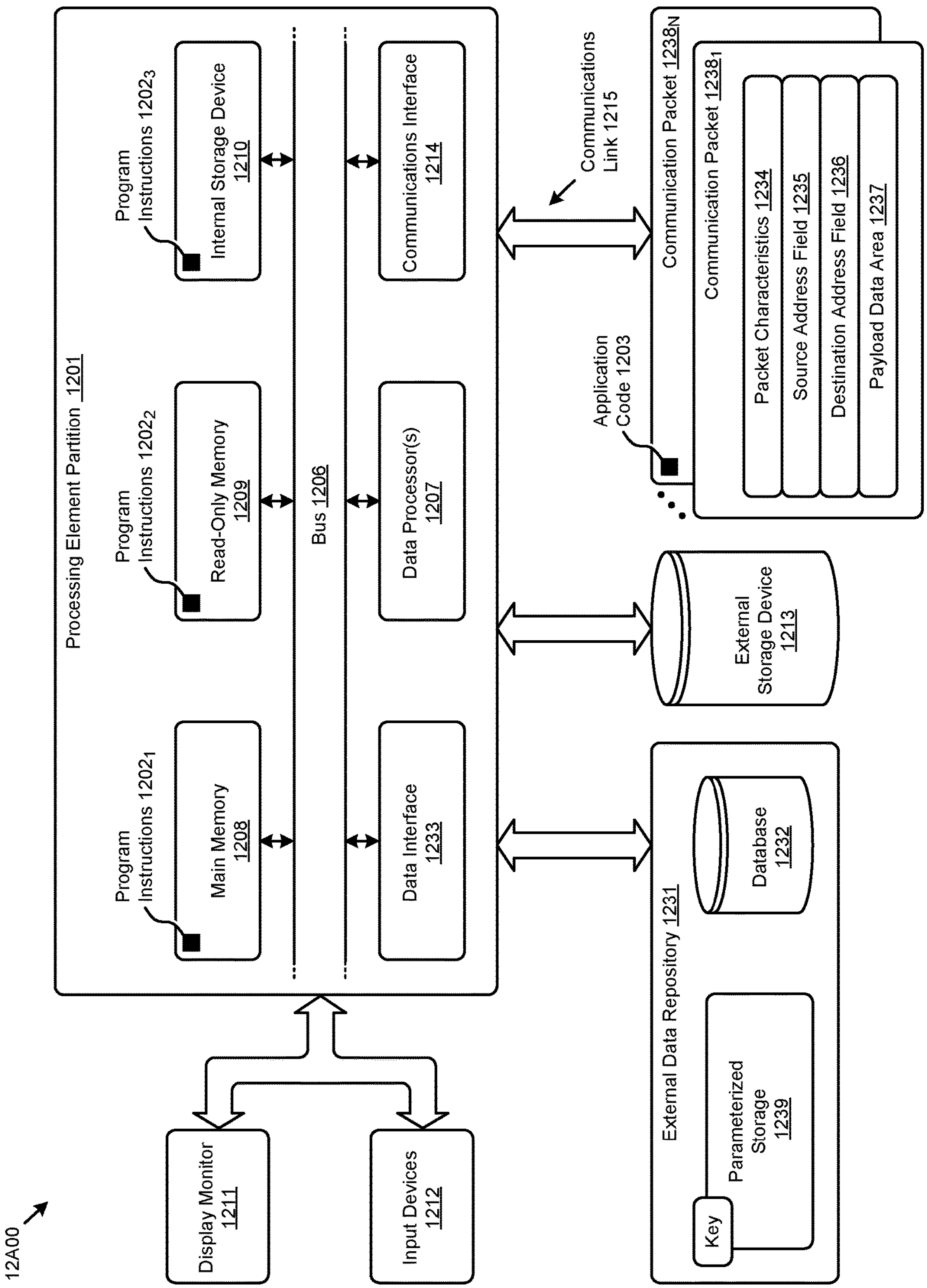
FIG. 12A and FIG. 12B present block diagrams of computer system architectures having components suitable for implementing embodiments of the present disclosure, and/or for use in the herein-described environments.

FIG. 12A depicts a block diagram of an instance of a computer system 12A00 suitable for implementing embodiments of the present disclosure. Computer system 12A00 includes a bus 1206 or other communication mechanism for communicating information. The bus interconnects subsystems and devices such as a central processing unit (CPU), or a multi-core CPU (e.g., data processor 1207), a system memory (e.g., main memory 1208, or an area of random access memory (RAM)), a non-volatile storage device or non-volatile storage area (e.g., read-only memory 1209), an internal storage device 1210 or external storage device 1213 (e.g., magnetic or optical), a data interface 1233, a communications interface 1214 (e.g., PHY, MAC, Ethernet interface, modem, etc.). The aforementioned components are shown within processing element partition 1201, however other partitions are possible. Computer system 12A00 further comprises a display 1211 (e.g., CRT or LCD), various input devices 1212 (e.g., keyboard, cursor control), and an external data repository 1231.

According to an embodiment of the disclosure, computer system 12A00 performs specific operations by data processor 1207 executing one or more sequences of one or more program code instructions contained in a memory. Such instructions (e.g., program instructions $\mathbf{1202}_1$, program instructions $\mathbf{1202}_2$, program instructions $\mathbf{1202}_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 12A00 performs specific networking operations using one or more instances of communications interface 1214. Instances of communications interface 1214 may comprise one or more networking ports that are configurable (e.g., pertaining to speed, protocol, physical layer characteristics, media access characteristics, etc.) and any particular instance of communications interface 1214 or port thereto can be configured differently from any other particular instance. Portions of a communication protocol can be carried out in whole or in part by any instance of communications interface 1214, and data (e.g., packets, data structures, bit fields, etc.) can be positioned in storage locations within communications interface 1214, or within system memory, and such data can be accessed (e.g., using random access addressing, or using direct memory access DMA, etc.) by devices such as data processor 1207.

Communications link 1215 can be configured to transmit (e.g., send, receive, signal, etc.) any types of communications packets (e.g., communication packet $\mathbf{1238}_1$, communication packet $\mathbf{1238}_N$) comprising any organization of data items. The data items can comprise a payload data area 1237, a destination address 1236 (e.g., a destination IP address), a source address 1235 (e.g., a source IP address), and can include various encodings or formatting of bit fields to populate packet characteristics 1234. In some cases, the packet characteristics include a version identifier, a packet or payload length, a traffic class, a flow label, etc. In some cases, payload data area 1237 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1207 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1231, which in turn can be formatted into any one or more storage areas, and which can comprise parameterized storage 1239 accessible by a key (e.g., filename, table name, block address, offset address, etc.).

Execution of the sequences of instructions to practice certain embodiments of the disclosure are performed by a single instance of a computer system 12A00. According to certain embodiments of the disclosure, two or more instances of computer system 12A00 coupled by a communications link 1215 (e.g., LAN, public switched telephone network, or wireless network) may perform the sequence of instructions required to practice embodiments of the disclosure using two or more instances of components of computer system 12A00.

Computer system 12A00 may transmit and receive messages such as data and/or instructions organized into a data structure (e.g., communications packets). The data structure can include program instructions (e.g., application code 1203), communicated through communications link 1215 and communications interface 1214. Received program code may be executed by data processor 1207 as it is received and/or stored in the shown storage device or in or upon any other non-volatile storage for later execution. Computer system 12A00 may communicate through a data interface 1233 to a database 1232 on an external data repository 1231. Data items in a database can be accessed using a primary key (e.g., a relational database primary key).

Processing element partition 1201 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1207. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to computing systems for heterogeneous regulatory control compliance monitoring and auditing. A module may include one or more state machines and/or combinational logic used to implement or facilitate the operational and/or performance characteristics pertaining to computing systems for heterogeneous regulatory control compliance monitoring and auditing.

Various implementations of database 1232 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of computing systems for heterogeneous regulatory control compliance monitoring and auditing). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to computing systems for heterogeneous regulatory control compliance monitoring and auditing, and/or for improving the way data is manipulated when performing computerized operations pertaining to mapping heterogeneous data representations of regulations into a common data format for auditing compliance/non-compliance of acts that are subject to the regulations.

Figure 12B:
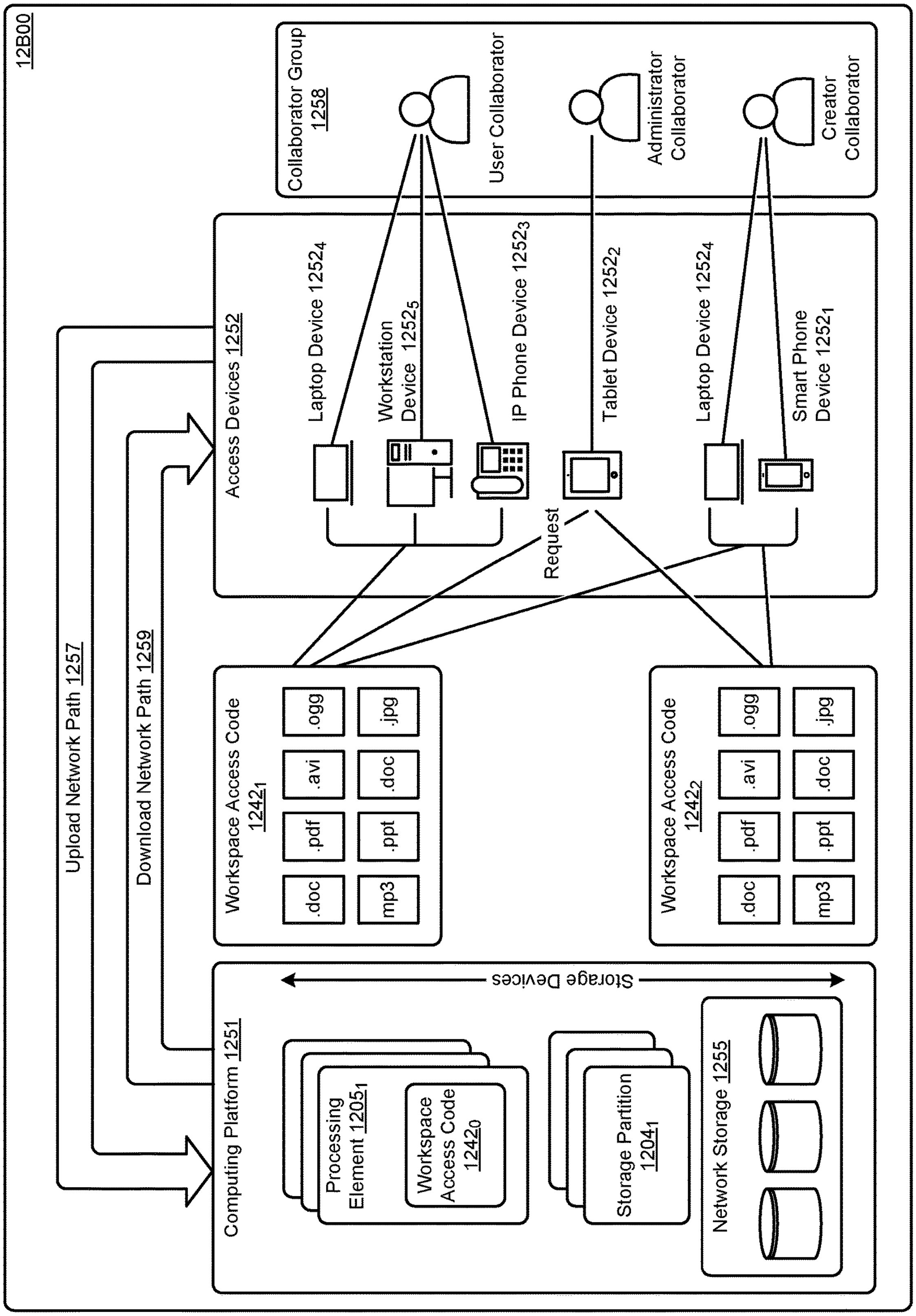

FIG. 12B depicts a block diagram of an instance of a cloud-based environment 12B00. Such a cloud-based environment supports access to workspaces through the execution of workspace access code (e.g., workspace access code $\mathbf{1242}_0$, workspace access code $\mathbf{1242}_1$, and workspace access code $\mathbf{1242}_2$). Workspace access code can be executed on any of access devices 1252 (e.g., laptop device $\mathbf{1252}_4$, workstation device $\mathbf{1252}_5$, IP phone device $\mathbf{1252}_3$, tablet device $\mathbf{1252}_2$, smart phone device $\mathbf{1252}_1$, etc.). A group of users can form a collaborator group 1258, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 1251, including in a middleware setting. As shown, a portion of the workspace access code resides in and can be executed on one or more processing elements (e.g., processing element 1205$_1$). The workspace access code can interface with storage devices such as networked storage 1255. Storage of workspaces and/or any constituent files or objects, and/or any other code or scripts or data can be stored in any one or more storage partitions (e.g., storage partition 1204$_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 1257). A stored workspace can be delivered to a particular user and/or shared with other particular users via a download (e.g., a download from a processing element to an access device over a download network path 1259).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method to apply regulatory compliance rules against regulatory control events that occur at a plurality of heterogeneous remote cloud-based systems, the method comprising:

maintaining a centralized cloud-based platform that manages compliance of a plurality of computing systems by applying a set of data compliance rules pertaining to regulatory control events, the set of data compliance rules corresponding to regulation of data access on the plurality of computing systems;

implementing a control layer and a mapping data structure to receive and process data in heterogeneous formats, the data to be received from a first computing system and a second computing system of the plurality of computing systems, the first computing system provides a first service to client devices and the second computing system provides a second service to the client devices, and the first and second computing systems are external to the centralized cloud-based platform, wherein the control layer and the mapping data structure are implemented at least by:

interfacing the first computing system with a first application programming interface (API) that natively communicates a first event having first observations pertaining to the first service over a first network component to the control layer, the first service having a first traversal sequence;

interfacing the second computing system that natively communicates a second event having second observations pertaining to the second service over a second network component to the control layer, the second service having a second traversal sequence different from the first traversal sequence;

receiving the first event having the first observations and the second event having the second observations at the control layer;

transforming, at the control layer, the heterogeneous formats of the first observations and the second observations into a common format at least by using one or more mapping rules in the mapping data structure, wherein the first observations correspond to the first event and represent how the data accessed at the first computing system was processed and the second observations correspond to the second event and represents how the data accessed at the second computing system was processed;

identifying, by the control layer, a first variation between the first service and the first traversal sequence and a second variation between the second service and the second traversal sequence, wherein the first and second traversal sequences define respective process flows; and determining, at the control layer, a first control action for the first service and a second control action for the second service based at least in part upon a corresponding one of the first or second variations; and performing, at the centralized cloud-based platform the first control action on the first service and the second control action on the second service.

2. The method of claim 1, wherein at least a portion of the set of data compliance rules is codified into at least one of the one or more mapping rules that correspond to an operation to be performed by the centralized cloud-based platform, and at least a portion of mapping rules pertains to a privacy regulation or a security regulation, and at least a portion of the one or more mapping rules comprises one or more logging actions, and the common format is a second format in which the second observations were natively generated by the second computing system.

3. The method of claim 2, wherein at least a portion of mapping rules pertains to data manipulation with respect to a first geographical territory associated with the first computing system and a second geographical territory associated with the second computing system, wherein the first and the second geographical territory correspond to different data compliance rules for a same data access activity to respectively access data on the first and the second computing systems.

4. The method of claim 2, wherein the control layer comprises a first plugin that interfaces with the first API on the first computing system, and the first API communicates a first set of controls, which provides the first observations to the centralized cloud-based platform, and sequencing information about a first sequence of data access processes, which pertains to a first access of data on the first computing system, to the centralized cloud-based platform via the control layer.

5. The method of claim 2, wherein at least one of one or more mapping rules in the mapping data structure is associated with at least one of one or more financial services compliance regulations, one or more biological technology compliance regulations, one or more federal government compliance regulations, one or more state government compliance regulations, one or more healthcare compliance regulations, one or more entertainment compliance regulations, one or more automotive compliance regulations, one or more power generation compliance regulations, or one or more oil and gas compliance regulations.

6. The method of claim 1, further comprising transforming the first traversal sequence into a first converted sequence in a common sequencing format and the second traversal sequence into a second converted sequence in the common sequencing format for determining the first and second variations.

7. The method of claim 1, further comprising processing a control event message received at the control layer in response to a detection of a control event from the first or the second observations, wherein processing the control event message comprises:

consulting one or more mapping rules that comprise information pertaining to one or more operations to respectively transform at least a portion of the first and the second traversal sequences; and storing the at least the first and the second traversal sequences.

8. The method of claim 1, wherein the centralized cloud-based platform receives first information pertaining to a first set of controls and second information pertaining to first observation points in the first set of controls in the first computing system via the control layer, and the control layer is implemented in the centralized cloud-based platform but not in the first computing system or the second computing system.

9. The method of claim 8, further comprising receiving a request to review adherence to a requested set of compliance regulations, wherein the request is received at an audit portal.

10. The method of claim 9, wherein the audit portal comprises an interface having at least one tool which, when invoked, generates a visual representation corresponding to a degree of compliance or non-compliance with respect to the requested set of compliance regulations.

11. The method of claim 10, further comprising generating a non-compliance alert, and one or more mapping rules are stored in the mapping data structure that further comprises information to invoke an operation to generate the non-compliance alert.

12. The method of claim 11, wherein the non-compliance alert comprises at least a portion of a visual representation in a user interface, the non-compliance alert corresponds to a specific data access through a first observation point and a second observation point of a first set of observation points along a network path, and the centralized cloud-based platform determines that a first portion of the first observations corresponding to the first observation point for specific data access satisfies a first data compliance rule while a second portion of the first observations corresponding to the second observation point for the specific data access violates the first data compliance rule of the set of data compliance rules.

13. The method of claim 1, further comprising:

determining a set of control actions to take based at least in part on a source of a control event message or based at least in part on contents of the control event message;

determining an order of initiation for the set of control actions based at least in part upon one or more mapping rules in the mapping data structure and a configuration or setting of the centralized cloud-based platform; and initiating the set of control actions based at least in part upon the order of initiation for the set of control actions.

14. A computer readable medium, embodied in a non-transitory computer readable medium having stored thereon a sequence of instructions which, when stored in memory and executed by one or more processors, causes the one or more processors to perform a set of acts to apply regulatory compliance rules against regulatory control events that occur at a plurality of heterogeneous remote cloud-based systems, the set of acts comprising:

maintaining a centralized cloud-based platform that manages compliance of a plurality of computing systems by applying a set of data compliance rules pertaining to regulatory control events, the set of data compliance rules corresponding to regulation of data access on the plurality of computing systems;

implementing a control layer and a mapping data structure to receive and process data in heterogeneous formats, the data to be received from a first computing system and a second computing system of the plurality of computing systems, the first computing system provides a first service to client devices and the second computing system provides a second service to the client devices, and the first and second computing systems are external to the centralized cloud-based platform, wherein the control layer and the mapping data structure are implemented at least by:

interfacing the first computing system with a first application programming interface (API) that natively communicates a first event having first observations pertaining to the first service over a first network component to the control layer, the first service having a first traversal sequence;

interfacing the second computing system that natively communicates a second event having second observations pertaining to the second service over a second network component to the control layer, the second service having a second traversal sequence different from the first traversal sequence;

receiving the first event having the first observations and the second event having the second observations at the control layer;

transforming, at the control layer, the heterogeneous formats of the first observations and the second observations into a common format at least by using one or more mapping rules in the mapping data structure, wherein the first observations correspond to the first event and represent how the data accessed at the first computing system was processed and the second observations correspond to the second event and represents how the data accessed at the second computing system was processed;

identifying, by the control layer, a first variation between the first service and the first traversal sequence and a second variation between the second service and the second traversal sequence, wherein the first and second traversal sequences define respective process flows; and determining, at the control layer, a first control action for the first service and a second control action for the second service based at least in part upon a corresponding one of the first or second variations; and performing, at the centralized cloud-based platform the first control action on the first service and the second control action on the second service.

15. The computer readable medium of claim 14, wherein at least a portion of the set of data compliance rules is codified into at least one of the one or more mapping rules that correspond to an operation to be performed by the centralized cloud-based platform, and at least a portion of mapping rules pertains to a privacy regulation or a security regulation.

16. The computer readable medium of claim 15, wherein at least a portion of mapping rules comprises one or more logging actions, and the common format is a second format in which the second observations were natively generated by the second computing system.

17. The computer readable medium of claim 15, wherein at least a portion of mapping rules pertains to data manipulation with respect to a first geographical territory associated with the first computing system and a second geographical territory associated with the second computing system, wherein the first and the second geographical territory correspond to different data compliance rules for a same data access activity to respectively access data on the first and the second computing systems.

18. The computer readable medium of claim 15, wherein the control layer comprises a first plugin that interfaces with the first API on the first computing system, and the first API communicates a first set of controls, which provides the first observations to the centralized cloud-based platform, and sequencing information about a first sequence of data access processes, which pertains to a first access of data on the first computing system, to the centralized cloud-based platform via the control layer.

19. A system to apply regulatory compliance rules against regulatory control events that occur at a plurality of heterogeneous remote cloud-based systems, the system comprising:

a non-transitory storage medium having stored thereon a sequence of instructions; and one or more processors that execute the sequence of instructions, wherein execution of the sequence of instructions causes a set of acts comprising:

maintaining a centralized cloud-based platform that manages compliance of a plurality of computing systems by applying a set of data compliance rules pertaining to regulatory control events, the set of data compliance rules corresponding to regulation of data access on the plurality of computing systems;

implementing a control layer and a mapping data structure to receive and process data in heterogeneous formats, the data to be received from a first computing system and a second computing system of the plurality of computing systems, the first computing system provides a first service to client devices and the second computing system provides a second service to the client devices, and the first and second computing systems are external to the centralized cloud-based platform, wherein the control layer and the mapping data structure are implemented at least by:

interfacing the first computing system with a first application programming interface (API) that natively communicates a first event having first observations pertaining to the first service over a first network component to the control layer, the first service having a first traversal sequence;

interfacing the second computing system that natively communicates a second event having second observations pertaining to the second service over a second network component to the control layer, the second service having a second traversal sequence different from the first traversal sequence;

receiving the first event having the first observations and the second event having the second observations at the control layer;

transforming, at the control layer, the heterogeneous formats of the first observations and the second observations into a common format at least by using one or more mapping rules in the mapping data structure, wherein the first observations correspond to the first event and represent how the data accessed at the first computing system was processed and the second observations correspond to the second event and represents how the data accessed at the second computing system was processed;

identifying, by the control layer, a first variation between the first service and the first traversal sequence and a second variation between the second service and the second traversal sequence, wherein the first and second traversal sequences define respective process flows; and determining, at the control layer, a first control action for the first service and a second control action for the second service based at least in part upon a corresponding one of the first or second variations; and performing, at the centralized cloud-based platform the first control action on the first service and the second control action on the second service.

20. The system of claim 19, wherein at least a portion of the set of data compliance rules is codified into at least one of the one or more mapping rules that correspond to an operation to be performed by the centralized cloud-based platform, and at least a portion of mapping rules pertains to a privacy regulation or a security regulation.

* * * * *